(12) United States Patent
Numata

(10) Patent No.: US 11,240,446 B2
(45) Date of Patent: Feb. 1, 2022

(54) IMAGING DEVICE, CONTROL APPARATUS, IMAGING METHOD, AND STORAGE MEDIUM

(71) Applicant: CANON KABUSHIKI KAISHA, Tokyo (JP)

(72) Inventor: Aihiko Numata, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/860,398

(22) Filed: Apr. 28, 2020

(65) Prior Publication Data
US 2020/0366854 A1 Nov. 19, 2020

(30) Foreign Application Priority Data

May 14, 2019 (JP) .............................. JP2019-091101

(51) Int. Cl.
*H04N 5/341* (2011.01)
*H04N 5/232* (2006.01)
*G06T 5/50* (2006.01)

(52) U.S. Cl.
CPC ............. *H04N 5/3415* (2013.01); *G06T 5/50* (2013.01); *H04N 5/23238* (2013.01); *G06T 2207/20221* (2013.01)

(58) Field of Classification Search
CPC ............. H04N 5/3415; H04N 5/23238; H04N 5/2258; G06T 2207/20221; G03B 37/04
See application file for complete search history.

(56) References Cited

U.S. PATENT DOCUMENTS

| 10,051,180 B1 * | 8/2018 | Chen ........................ G06T 7/194 |
| 10,585,344 B1 * | 3/2020 | Lablans ............... H04N 5/2259 |
| 2010/0097444 A1 * | 4/2010 | Lablans ................ G03B 35/00 |
| | | 348/46 |

(Continued)

FOREIGN PATENT DOCUMENTS

| CN | 108900764 A | 11/2018 |
| JP | 2004118786 A | 4/2004 |
| WO | 2018076883 A1 | 5/2018 |

OTHER PUBLICATIONS

Extend European Search Report issued by the European Patent Office dated Aug. 26, 2020, in corresponding EP Patent Application No. 20173281.5.

*Primary Examiner* — Rowina J Cattungal
(74) *Attorney, Agent, or Firm* — Carter, DeLuca & Farrell LLP

(57) ABSTRACT

In order to be able to appropriately control whether to generate a wide-angle image in accordance with control of an imaging range of the plurality of imaging units, an imaging device includes: a first imaging unit and a second imaging unit, each of which is movable in a predetermined direction; a combination processing unit configured to combine a first image obtained by the first imaging unit and a second image obtained by the second imaging unit to generate a wide-angle image; a determination unit configured to determine whether or not to generate the wide-angle image by the combination processing unit, based on a relation between an imaging range of the first imaging unit and an imaging range of the second imaging unit, or a position relation between the first imaging unit and the second imaging unit in the predetermined direction.

14 Claims, 18 Drawing Sheets

(56) References Cited

U.S. PATENT DOCUMENTS

| | | | |
|---|---|---|---|
| 2013/0038680 A1* | 2/2013 | Mashiah | G06T 3/4038 |
| | | | 348/36 |
| 2013/0044240 A1* | 2/2013 | Leskela | H04N 5/2258 |
| | | | 348/239 |
| 2014/0160234 A1* | 6/2014 | Okuda | H04N 5/2621 |
| | | | 348/36 |
| 2016/0077422 A1 | 3/2016 | Wang et al. | |
| 2016/0295108 A1* | 10/2016 | Cao | H04N 17/002 |
| 2018/0227485 A1* | 8/2018 | Shimauchi | G03B 37/04 |
| 2019/0279337 A1* | 9/2019 | Cheng | H04N 5/2258 |
| 2020/0033701 A1 | 1/2020 | Numata | |
| 2020/0098148 A1 | 3/2020 | Numata | |
| 2020/0137293 A1 | 4/2020 | Numata | |
| 2020/0154087 A1 | 5/2020 | Numata | |
| 2020/0294214 A1 | 9/2020 | Numata | |

* cited by examiner

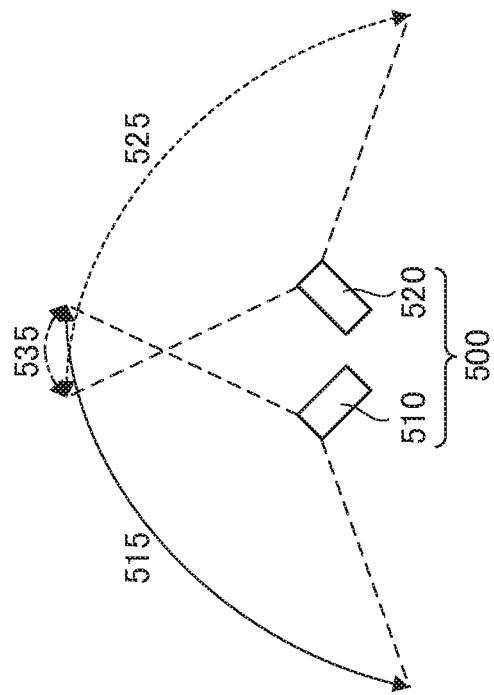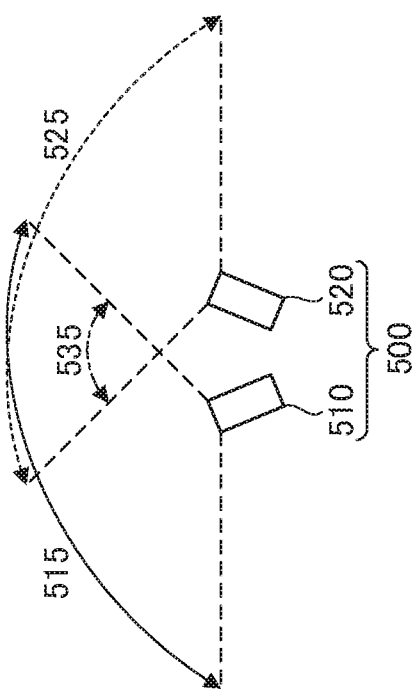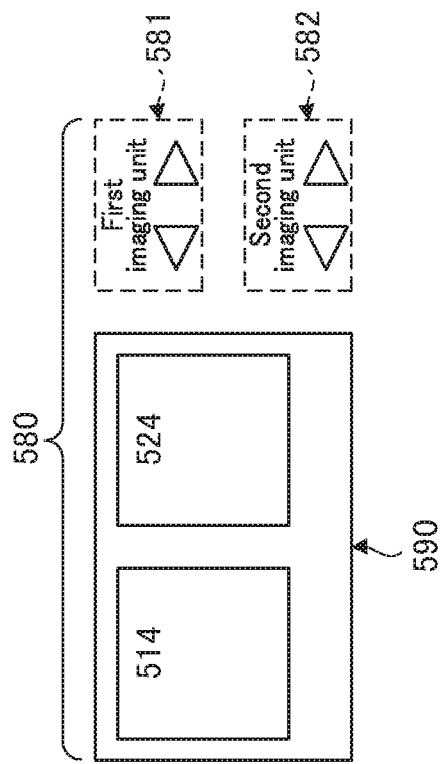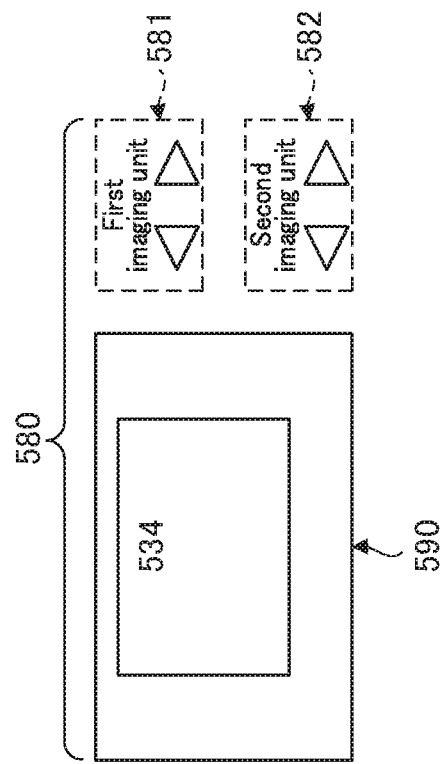

IMAGING DEVICE, CONTROL APPARATUS, IMAGING METHOD, AND STORAGE MEDIUM

BACKGROUND OF THE INVENTION

Field of the Invention

The present invention relates to an imaging device used for applications such as monitoring.

Description of the Related Art

In recent years, when images captured by a plurality of cameras (hereinafter referred to as "multi-lens cameras") are combined, imaging devices capable of acquiring an image in a wider imaging range (hereinafter referred to as a "wide-angle image") than when a single camera is used have been proposed.

Japanese Patent Laid-Open No. 2004-118786 proposes an imaging device which generates a wide-angle image by performing matching processing while shifting images captured by cameras in multi-lens cameras to acquire an amount of shifting between a plurality of images.

Also, as imaging devices used when a user wants to change a direction desired to be monitored or the like after the imaging devices are installed, imaging devices having a so-called pan tilt zoom (PTZ) function in which an imaging direction can be controlled have been proposed.

In the imaging device described in Japanese Patent Laid-Open No. 2004-118786, relative positions of a plurality of cameras are fixed. On the other hand, if a mechanism for controlling an imaging direction of each camera of multi-lens cameras is added, a user can change a location desired to be monitored more freely.

In such multi-lens cameras, images obtained by each camera can be provided to an external monitor at the same time. However, as a result of controlling the imaging direction of each camera of multi-lens cameras, overlaps of imaging ranges of neighboring cameras in the multi-lens cameras sometimes occur and sometimes not, and it is difficult for users whether overlaps are occurring or not.

Thus, an object of the present invention is to propose an imaging device including a plurality of imaging units and capable of appropriately controlling whether to generate a wide-angle image in accordance with control of the imaging ranges of the plurality of imaging units.

SUMMARY OF THE INVENTION

An imaging device of the present invention includes: a first imaging unit and a second imaging unit, each of which is movable in a predetermined direction;
a combination processing unit configured to combine a first image obtained by the first imaging unit and a second image obtained by the second imaging unit to generate a wide-angle image;
a determination unit configured to determine whether or not to generate the wide-angle image by the combination processing unit, based on a relation between an imaging range of the first imaging unit and an imaging range of the second imaging unit, or a position relation between the first imaging unit and the second imaging unit in the predetermined direction.

Further features of the present invention will become apparent from the following description of exemplary embodiments with reference to the attached drawings.

BRIEF DESCRIPTION OF THE DRAWINGS

FIGS. 18A-18D are diagrams illustrating an example of the display screen and the movement of the imaging unit when the imaging unit transitions from a non-wide-angle image display mode.

DESCRIPTION OF THE EMBODIMENTS

Figure 1:
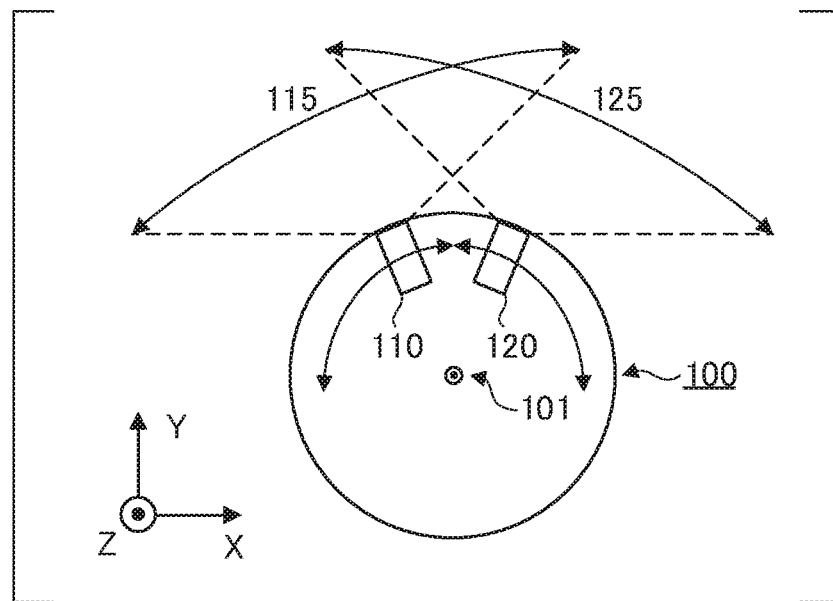
FIG. 1 is an arrangement view of an imaging device in a first embodiment when viewed from above.

A practical example of an imaging device according to an embodiment of the present invention will be described below with reference to the drawings. At this time, constituent elements having the same functions in the drawings will be denoted by the same reference numerals and repeated description thereof will be omitted.

In the practical example, an example in which the present invention is applied to a network camera as an imaging device will be described. However, the imaging device includes electronic devices having a plurality of imaging units such as digital still cameras, digital movie cameras, smartphones with a camera, and tablet computers with a camera.

First Embodiment

Figure 2:
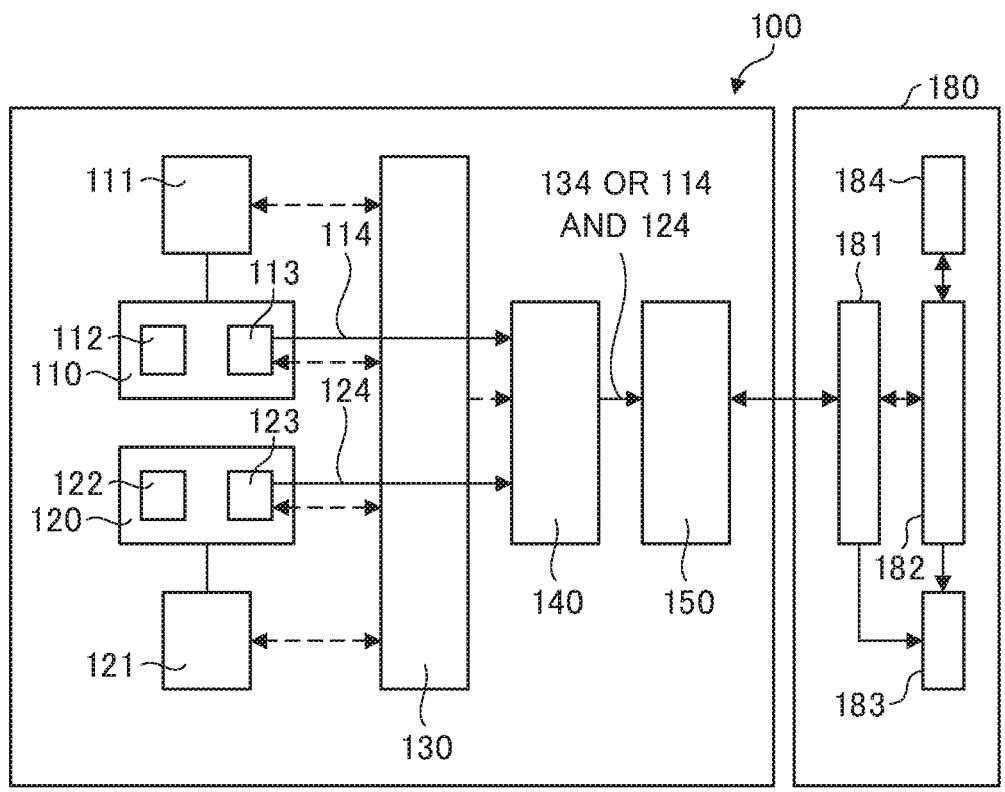
FIG. 2 is a functional block diagram of the imaging device in the first embodiment.

FIG. 1 illustrates an imaging device in this practical example and a monitoring system using the same. FIG. 1 is an arrangement view of an imaging device 100 when viewed from above (a +Z axis side) and FIG. 2 is an internal functional block diagram. The imaging device 100 includes a first imaging unit 110, a second imaging unit 120, a first driving mechanism 111, a second driving mechanism 121, a control unit 130, a combination (synthesizing) processing unit 140, and a first transmission/reception unit 150.

Each of the first driving mechanism 111 and the second driving mechanism 121 functions as a driving unit and is configured to be able to control an imaging direction or a the imaging range of the first imaging unit 110 and the second imaging unit 120 at least in the same plane (in an XY plane in FIG. 1). The imaging device in this practical example is configured to be able to control the imaging direction in a pan direction.

To be specific, the first driving mechanism 111 and the second driving mechanism 121 illustrated in FIG. 2 include a motor and a gear and are configured to be able to rotate the first imaging unit 110 and the second imaging unit 120 using an axis 101 in FIG. 1 as a rotation axis by controlling electric power used for driving the motor. The electric power used for driving the motor is controlled by the control unit 130.

That is to say, the imaging device 100 is configured to be able to change an imaging direction of each of the first imaging unit 110 and the second imaging unit 120 in the XY plane. Although the imaging directions of both of the first imaging unit 110 and the second imaging unit 120 can be changed in this practical example, a driving mechanism capable of controlling at least one of the imaging directions is provided and thus the imaging directions of the first imaging unit and the second imaging unit may only be relatively changeable.

The first imaging unit 110 includes an imaging optical system 112 and a solid-state imaging device 113, the second imaging unit 120 includes an imaging optical system 122 and a solid-state imaging device 123, and the first imaging unit 110 and the second imaging unit 120 form subject images on the solid-state imaging devices 113 and 123 through the imaging optical systems 112 and 122 to acquire an image. The driving and the signal reading of each of the solid-state imaging devices 113 and 123 is controlled by the control unit 130. The control unit 130 has a central processing unit (CPU) as a computer built thereinto and functions as a control unit configured to execute various operations of the entire device on the basis of a computer program stored in a memory (not shown).

The combination processing unit 140 functions as a combining unit and is configured to combine a first image signal 114 acquired by the first imaging unit 110 and a second image signal 124 acquired by the second imaging unit 120 to generate a wide-angle image (panoramic image) signal 134. To be specific, by applying a so-called pattern matching technique for obtaining a correlation coefficient while shifting an overlapping portion of images, an amount of positional shifting between a plurality of images is obtained and the wide-angle image signal 134 is generated.

Also, in this practical example, an overlapping range (an amount of overlapping) between an imaging range 115 of the first imaging unit 110 and an imaging range 125 of the second imaging unit 120 is investigated. Furthermore, the wide-angle image signal 134 is not generated when the overlapping range (the amount of overlapping) is less than a first threshold value and the wide-angle image signal 134 is generated when the overlapping range (the amount of overlapping) is equal to or more than the first threshold value. Details will be described later. When the wide-angle image signal 134 is not generated in the combination processing unit 140, the first image signal 114 and the second image signal 124 are transferred to the first transmission/reception unit 150 without being combined.

The first transmission/reception unit 150 transmits an image signal (the first image signal 114, the second image signal 124, or the wide-angle image signal 134) which has been transferred from the combination processing unit 140 to an external client device 180 (not shown) over a wired or wireless network or the like.

The external client device 180 transmits a command for controlling the imaging device 100 to the first transmission/reception unit 150 over a second transmission/reception unit 181 and a network and the imaging device 100 receives the command and returns a response to the command to the client device 180.

The command is, for example, for controlling the first driving mechanism 111 and the second driving mechanism 121. That is to say, a user can control directions of the first imaging unit 110 and the second imaging unit 120 from the external client device 180 over a network.

The client device is, for example, an external device such as a personal computer (PC) and the network is configured of wired local area networks (LANs), wireless LANs, or the like. Furthermore, a configuration in which electric power is supplied to the imaging device 100 over the network may be provided.

A control unit configured to control the inside of the client device 180 and having a computer such as a CPU built thereinto will be denoted with reference numeral 182. Furthermore, the control unit 182 has a memory (not shown) built thereinto and a computer program configured to control an operation of the CPU in the control unit is stored in the memory. A display unit serving as a display unit and configured to display an image signal or the like which has been transferred from the imaging device 100 will be denoted with reference numeral 183. An operation unit including input units such as various switches and touch panels will be denoted with reference numeral 184. The user can give various instructions to the imaging device 100 by operating the operation unit.

Although the combination processing unit 140 is provided inside the imaging device 100 in the practical example, the combination processing unit 140 may be provided in the client device 180. Furthermore, an imaging system is constituted of the imaging device 100 and the client device 180.

In a first embodiment illustrated in FIG. 2, an example in which the imaging device 100 includes the first transmission/reception unit 150, an image is transmitted to the client device 180 side, and an operation is performed through a command from the client device 180 side is illustrated.

That is to say, an example in which a display unit 183, the control unit 182, and an operation unit 184 are provided separately from the imaging device is illustrated. However, the imaging device 100 may integrally include a memory configured to store image data and a part of the operation unit 184 or the like such as the display unit 183 configured to display an image and a switch configured to receive the user's assistance. That is to say, the imaging device 100 itself may have a function of the client device 180 integrally built thereinto.

As described above, in the imaging device 100 in this practical example, when a size of the overlapping range (the amount of overlapping) 135 between the imaging range 115 of the first imaging unit 110 and the imaging range 125 of the second imaging unit 120 is equal to or more than the first threshold value, the wide-angle image signal 134 is generated. Furthermore, a configuration in which, when the size of the overlapping range 135 is less than the first threshold value, the wide-angle image signal 134 is not generated is provided.

With such a configuration, it is possible to provide an image having excellent visibility of a subject regardless of the imaging directions of the first imaging unit 110 and the second imaging unit 120. Details will be provided in the following description.

FIGS. 3 and 4 are diagram illustrating a first imaging range 115 of the first imaging unit 110, a second imaging range 125 of the second imaging unit 120, and an overlapping range 135 thereof.

Figure 3A:
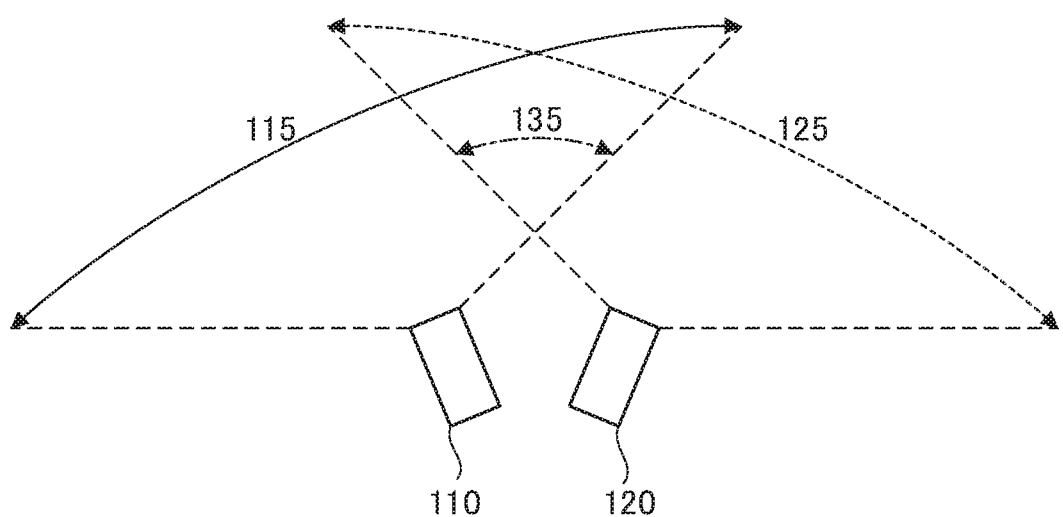
FIGS. 3A and 3B are diagrams illustrating a case in which an overlap of the imaging ranges of imaging units in the imaging device in the first embodiment is large.
Figure 3B:
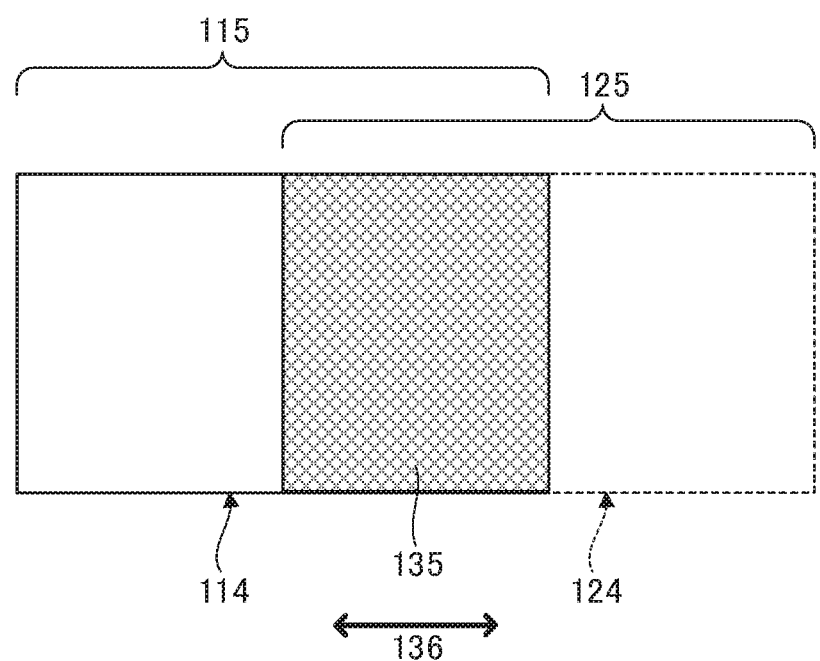
Figure 4A:
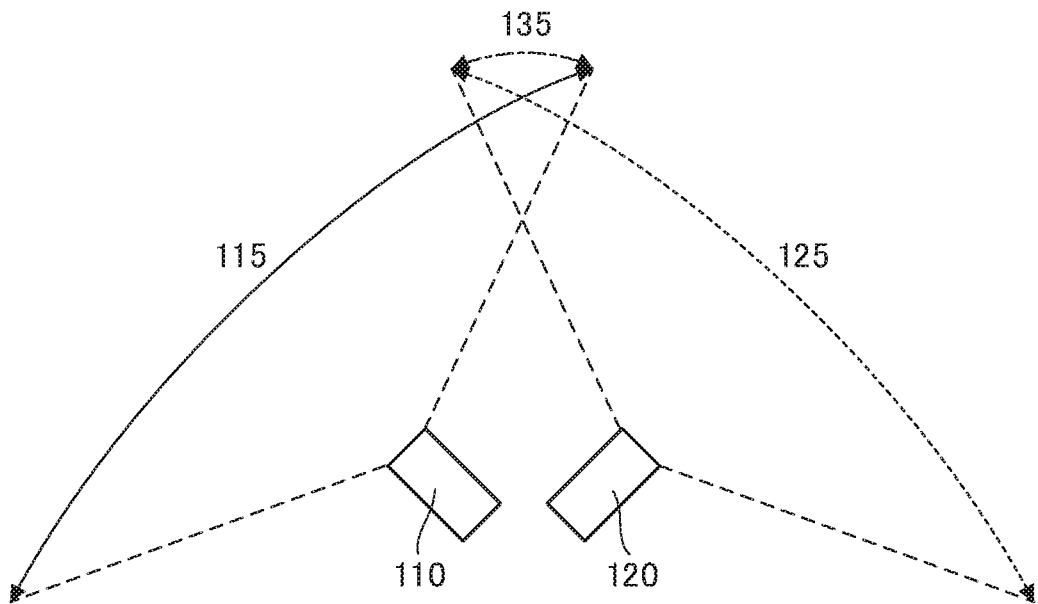
FIGS. 4A and 4B are diagrams illustrating a case in which an overlap of the imaging ranges of the imaging units in the imaging device in the first embodiment is small.
Figure 4B:
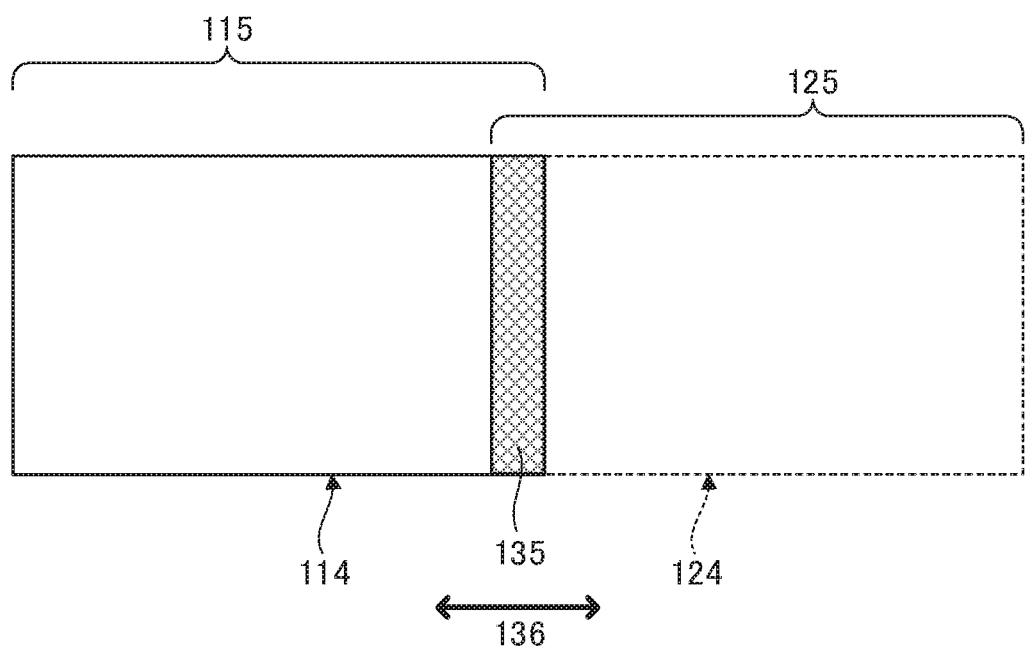

FIGS. 3A and 3B illustrate a case in which the overlapping range (the amount of overlapping) 135 is equal to or more than a first threshold value 136 and FIGS. 4A and 4B illustrate a case in which the overlapping range 135 is less than the first threshold value 136. In FIG. 3, the overlapping range 135 corresponds to a hatched region.

In order to generate the wide-angle image signal 134, an amount of positional shifting between the first image signal 114 and the second image signal 124 can be obtained. In order to obtain the amount of positional shifting, a general method as described in Patent Document 1 can be used. For example, a correlation coefficient such as a sum of squared difference (SSD) and a sum of absolute difference (SAD) may be calculated while shifting the first image signal 114 and the second image signal 124 so that an amount of positional shifting having the highest correlation coefficient may be obtained.

Generally, if a correlation coefficient is obtained using the SSD or the SAD, when the number of pixel signals used for calculating an amount of positional shifting increases, a correlation coefficient having a high accuracy can be obtained. As can be seen from FIG. 3, when the overlapping range 135 increases, the number of pixel signals used for calculating an amount of positional shifting increases. Therefore, when the overlapping range 135 increases, an amount of positional shifting having a high accuracy can be obtained and a wide-angle image having a high quality can be generated. On the other hand, when the overlapping range 135 decreases, the detection of the amount of positional shifting decreases. Thus, it is difficult to generate a wide-angle image having a high quality.

When the wide-angle image signal 134 having a high quality can be generated, the visibility of the subject in the overlapping range 135 when the wide-angle image signal 134 is obtained by combining the first image signal 114 and the second image signal 124 is higher than that when the first image signal 114 and the second image signal 124 are observed independently. On the other hand, when it is difficult to generate the wide-angle image signal 134 having a high quality, even if the wide-angle image signal 134 is generated, the wide-angle image signal 134 is likely to be generated with an incorrect amount of positional shifting. That is to say, when the wide-angle image is generated, information included in the first image signal 114 and the second image signal 124 is likely to be lost.

Therefore, when it is difficult to generate the wide-angle image signal 134 having a high quality, the visibility of the subject when the first image signal 114 and the second image signal 124 are displayed separately is superior than that when the wide-angle image signal 134 is displayed.

Thus, in the imaging device 100 in this practical example, the overlapping range 135 is equal to or more than the first threshold value 136. When it is possible to generate a wide-angle image signal having a high quality, the wide-angle image signal 134 is generated in the combination processing unit 140.

On the other hand, when the overlapping range 135 is less than the first threshold value 136 and it is difficult to generate a wide-angle image signal having a high quality, the wide-angle image signal is not generated in the combination processing unit 140. Furthermore, the first image signal 114 and the second image signal 124 are transmitted as they are and displayed separately. With such a configuration, it is possible to provide an image having excellent visibility of the subject regardless of the imaging directions of the first imaging unit 110 and the second imaging unit 120.

As can be seen from FIG. 3, when the deviation between the imaging direction of the first imaging unit 110 and the imaging direction of the second imaging unit 120 decreases, the overlapping range 135 increases. Therefore, in the imaging device 100 in the first embodiment, a configuration in which, when the deviation between the imaging direction of the first imaging unit 110 and the imaging direction of the second imaging unit 120 is equal to or less than a predetermined threshold value, a wide-angle image signal is generated, and when the deviation between the imaging direction of the first imaging unit 110 and the imaging direction of the second imaging unit 120 is larger than the predetermined threshold value, the wide-angle image signal is not generated can also be provided. Here, the imaging direction of the imaging unit means a direction of an optical axis of the imaging optical system of the imaging unit.

Also, the first threshold value 136 can also be determined using the number of pixels in the overlapping range 135. To be specific, between the first image signal 114 and the second image signal 124, the number of pixels of the first image signal 114 and the second image signal 124 included in the overlapping range 135 is preferably 100 or more and more preferably 1000 or more.

Also, the first threshold value 136 may be defined as a relative ratio to the first imaging range 115 or the second imaging range 125. To be specific, the overlapping range is preferably 5% or more and more preferably 20% or more with respect to a relatively narrower imaging range of the first imaging range 115 and the second imaging range 125.

Although FIG. 1 illustrates a case in which the imaging device 100 is constituted of two imaging units, i.e., the first imaging unit 110 and the second imaging unit 120, the imaging device 100 may be constituted of three or more imaging units. When the imaging device 100 is constituted of three or more imaging units, it is desirable that a configuration in which whether to generate a wide-angle image signal through combination is determined is provided in accordance with the overlapping range between the imaging ranges of the imaging units.

To be specific, when the overlapping range between the imaging ranges of neighboring imaging units is equal to or more the first threshold value, a wide-angle image signal is generated by combining the image signals acquired using the imaging units. On the other hand, when the overlapping range between the imaging ranges of neighboring imaging units is less than the first threshold value, a configuration in which the image signals acquired using the imaging units are not combined is provided.

Figure 5:
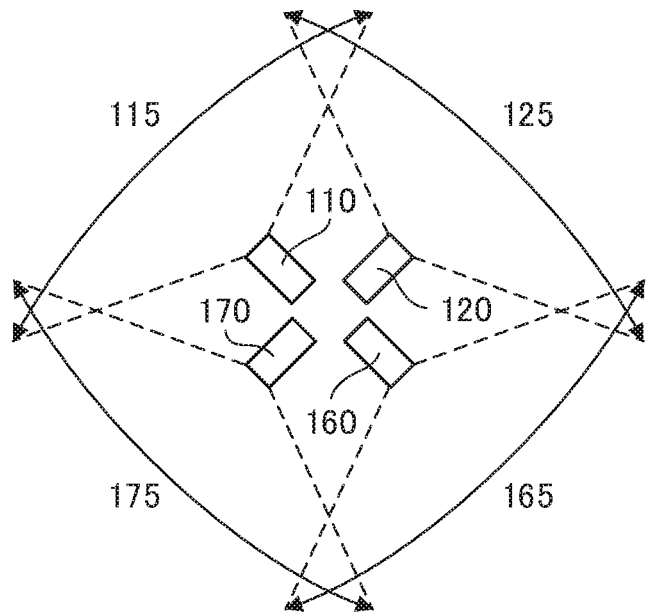
FIG. 5 is a diagram illustrating another example of the imaging ranges and overlapping ranges of the imaging units in the imaging device in the first embodiment.

FIG. 5 illustrates an example in which the imaging device 100 is constituted of four imaging units, i.e., the imaging units 110, 120, 160, and 170 arranged in this order clockwise. The imaging ranges of the imaging units are 115, 125, 165, and 175.

As illustrated in FIG. 5, when the overlapping ranges between the imaging ranges of imaging units are all equal to or more than the first threshold value, one wide-angle image signal 134 is generated by combining all of the image signals 114, 124 and image signals 164 and 174 obtained through imaging using the imaging units.

Figure 6:
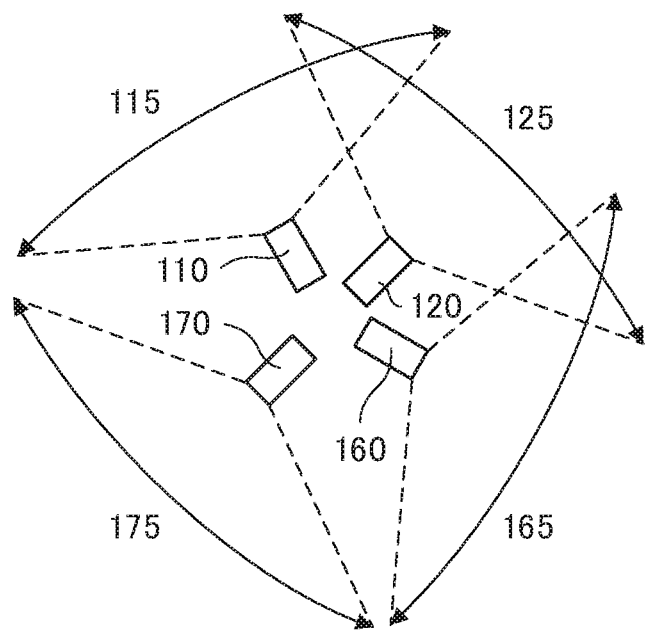
FIG. 6 is a diagram illustrating still another example of the imaging ranges and the overlapping range of the imaging units in the imaging device in the first embodiment.

On the other hand, FIG. 6 illustrates a case in which the overlapping ranges between the imaging units 110 and 120 and between the imaging units 120 and 160 are equal to or more than the first threshold value 136 and the overlapping ranges between the imaging units 170 and 110 and between the imaging units 160 and 170 are less than the first threshold value 136. At this time, the wide-angle image signal 134 is generated by combining the image signals 114, 124, and 164 from the imaging units 110, 120, and 160 and the image signal 174 imaged using the imaging unit 170 is not combined with another image signal.

Figure 7:
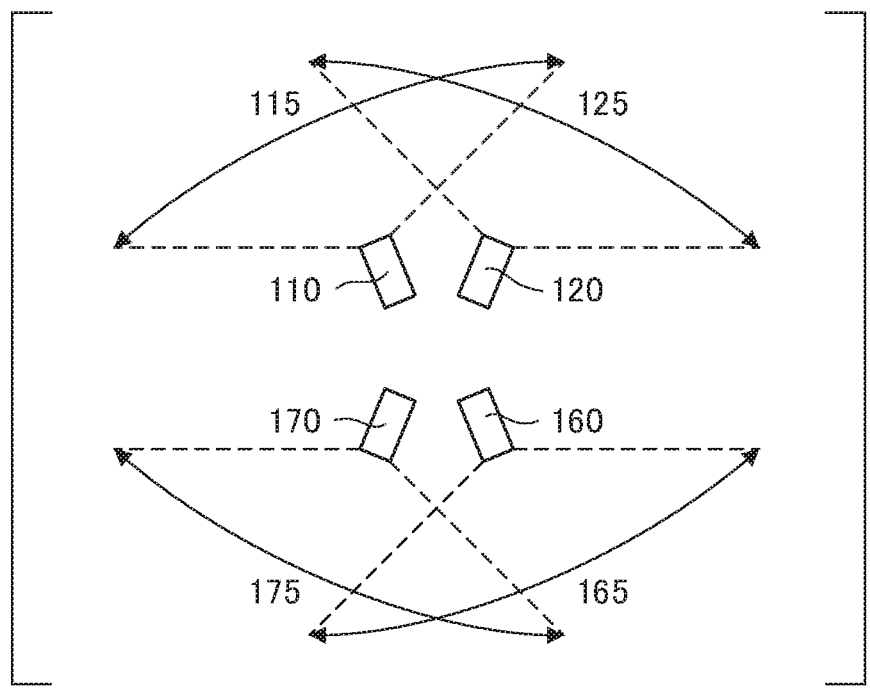
FIG. 7 is a diagram illustrating another example of the imaging ranges and the overlapping range of the imaging units in the imaging device in the first embodiment.

FIG. 7 illustrates a case in which the overlapping ranges between the imaging units 110 and 120 and between the imaging units 160 and 170 is equal to or more than the first threshold value 136 and the overlapping ranges between the imaging units 170 and 110 and between the imaging units 120 and 160 are less than the first threshold value 136.

At this time, two wide-angle image signals 134A and 134B are generated by combining the image signals 114 and the image signal 124 from the imaging units 110 and 120 and combining the image signal 164 and the image signal 174 from the imaging units 160 and 170.

Figure 8:
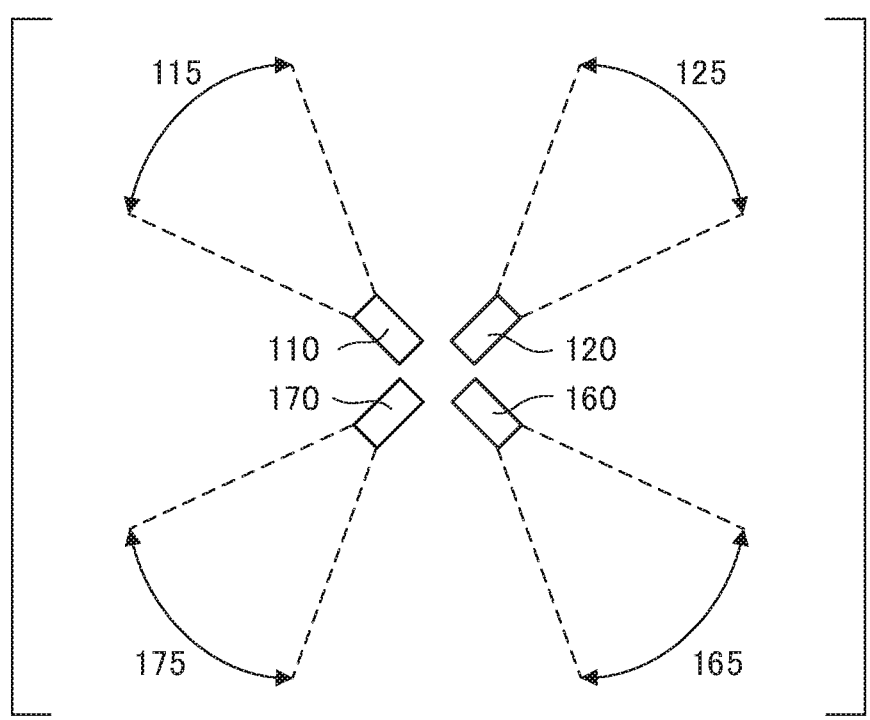
FIG. 8 is a diagram illustrating still another example of the imaging ranges and the overlapping range of the imaging units in the imaging device in the first embodiment.

Also, as illustrated in FIG. 8, when the overlapping ranges between the imaging ranges of the imaging units are all less than the first threshold value 136, none of the image signals 114, 124, 164, and 174 imaged using the imaging units is combined with other image signals.

Second Embodiment

An imaging device 200 (not shown) in a second embodiment and the imaging device 100 illustrated in the first embodiment differ in view of only the functions of the first driving mechanism and the second driving mechanism. In the imaging device 200 in the second embodiment, a first driving mechanism 211 (not shown) and a second driving mechanism 212 (not shown) are configured in such a manner that the imaging directions of the first imaging unit 210 (not shown) and the second imaging unit 220 (not shown) are set so that the first imaging unit 210 (not shown) and the second imaging unit 220 (not shown) can rotate in two directions orthogonal to each other. To be specific, in addition to a rotation mechanism centering on a Z axis (a so-called pan driving mechanism), a rotation mechanism capable of controlling an angle with respect to the Z axis (a so-called tilt driving mechanism) is provided.

Figure 9A:
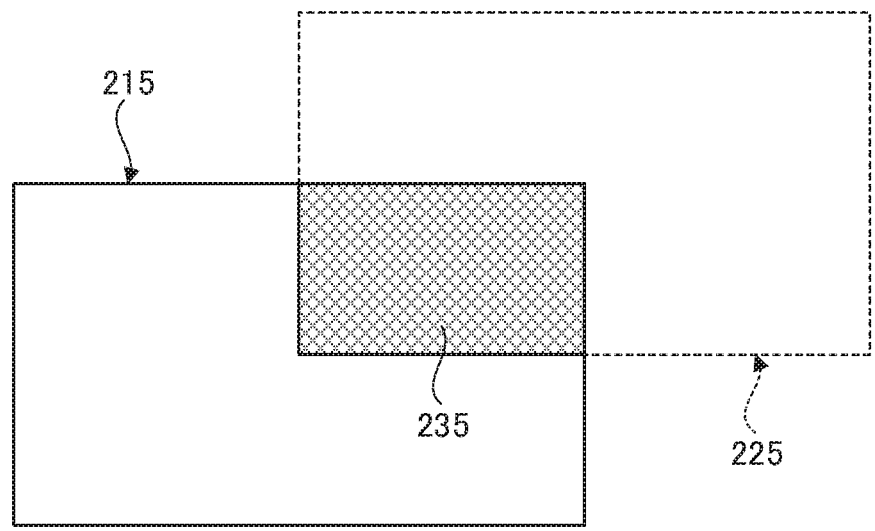
FIGS. 9A and 9B are diagrams illustrating an example of the imaging ranges and overlapping ranges of imaging units in an imaging device in a second embodiment.

Also, as illustrated in FIG. 9A, when a size (an area) of an overlapping range 235 between an imaging range 215 of the first imaging unit 210 and an imaging range 225 of the second imaging unit 220 is equal to or more than a first threshold value (an area value), a wide-angle image signal 234 is generated. Furthermore, as illustrated in FIG. 9B, when the size (the area) of the overlapping range 235 between the imaging range 215 of the first imaging unit 210 and the imaging range 225 of the second imaging unit 220 is less than the first threshold value, the wide-angle image signal 234 is not generated.

Figure 9B:
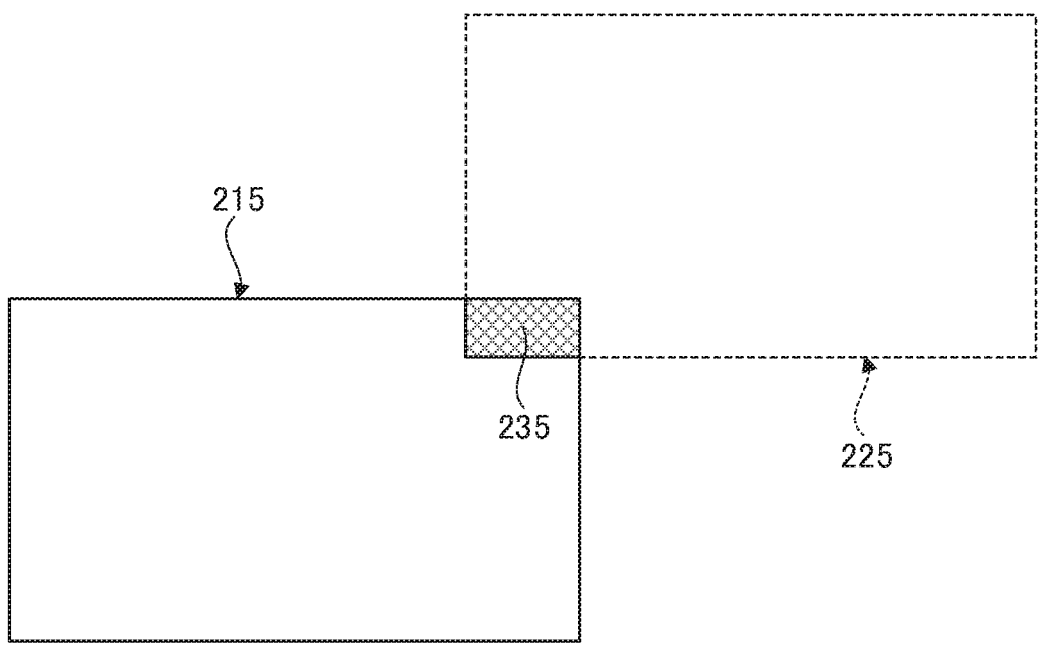

That is to say, FIGS. 9A and 9B are diagrams illustrating the first imaging range 215 of the first imaging unit 210, the second imaging range 225 of the second imaging unit 220, and the overlapping range 235. FIG. 9A illustrates a case in which the overlapping range 235 is large and FIG. 9B illustrates a case in which the overlapping range 235 is small. In FIGS. 9A and 9B, the overlapping range 235 corresponds to a hatched region.

As can be seen from FIGS. 9A and 9B, when the deviation between an imaging direction of the first imaging unit 110 and an imaging direction of the second imaging unit 120 in the XY plane (refer to FIG. 1) decreases, a size of the overlapping range 235 in a pan direction thereof (a vertical direction in FIGS. 9A and 9B) increases. Furthermore, when the deviation between the imaging direction of the first imaging unit 110 and the imaging direction of the second imaging unit 120 in a Z direction (refer to FIG. 1) decreases, a size of the overlapping range 235 in a tilt direction thereof (a horizontal direction in FIGS. 9A and 9B) increases.

Therefore, in the imaging device 200 in the second embodiment, a determination concerning whether a wide-angle image signal is generated may be performed using the product of the deviation between the imaging direction of the first imaging unit 210 and the imaging direction of the second imaging unit 220 in the pan direction thereof and the deviation thereof in the tilt direction thereof.

To be specific, when the product of the deviations in the pan direction and the tilt direction is equal to or less than the first threshold value, a wide-angle image signal is generated and when the product of the deviations in the pan direction and the tilt direction is larger than the first threshold value, the wide-angle image signal is not generated.

Also, in this case, imaging signals of the first imaging unit 210 and the second imaging unit 220 are output as they are without being combined and displayed separately.

This practical example may be applied to an imaging device including only a tilt driving mechanism instead of an imaging device including both a pan driving mechanism and a tilt driving mechanism.

Third Embodiment

FIG. 10 is a diagram for explaining a third embodiment. An imaging device 300 (not shown) in the third embodiment and the imaging device 200 illustrated in the second embodiment differ in view of only the functions of a first driving mechanism and the second driving mechanism. In the imaging device 300, in addition to being able to control imaging directions of a first imaging unit 310 (not shown) and a second imaging unit 320 (not shown), a rotation mechanism capable of rotating imaging units about optical axes of the imaging units (a so-called rotation mechanism) is provided.

Also, when a size (an area) of an overlapping range 335 between an imaging range 315 of the first imaging unit 310 and an imaging range 325 of the second imaging unit 320 is equal to or more than a first threshold value, a wide-angle image signal 334 is generated and when the size (the area) of the overlapping range 335 between the imaging range 315 of the first imaging unit 310 and the imaging range 325 of the second imaging unit 320 is less than the first threshold value, the wide-angle image signal 334 is not generated.

Figure 10A:
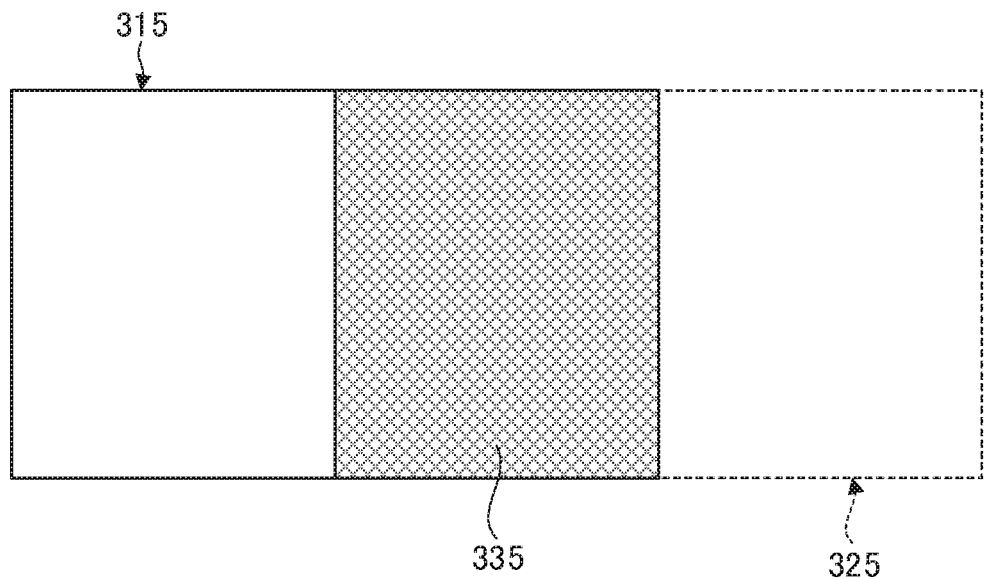
FIGS. 10A and 10B are diagrams illustrating an example of the imaging ranges and overlapping ranges of imaging units in an imaging device in a third embodiment.
Figure 10B:
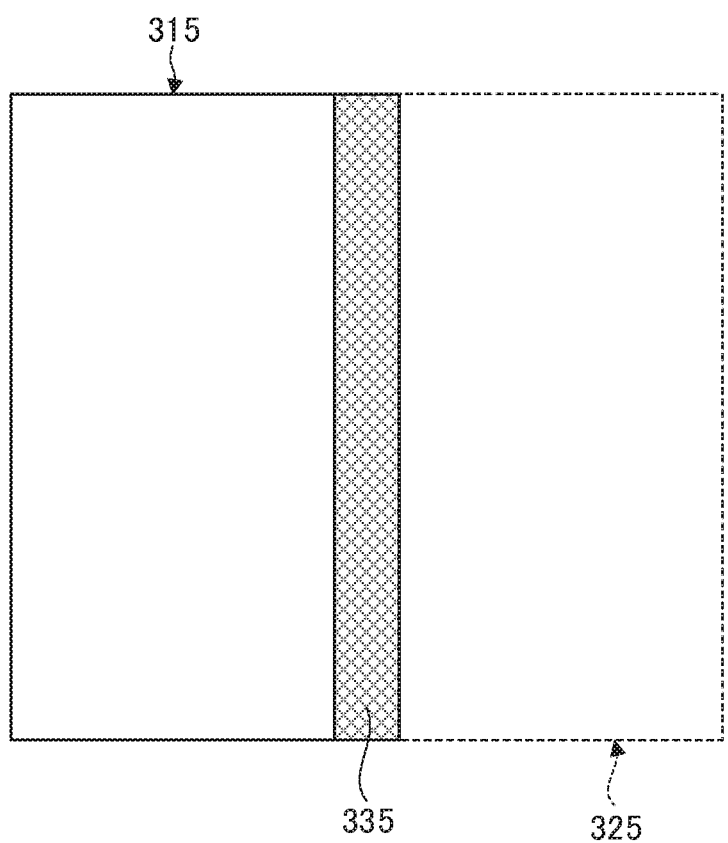

FIGS. 10A and 10B illustrate the first imaging range 315 of the first imaging unit 310, the second imaging range 325 of the second imaging unit 320, and the overlapping range 335. FIG. 10A illustrates a case in which the overlapping range 335 is large and FIG. 10B illustrates a case in which the imaging direction of each of the imaging units rotates 90 degrees to the right while the imaging direction of each of the imaging units is maintained from the state of FIG. 10A. In FIGS. 10A and 10B, the overlapping range 135 corresponds to a hatched region.

Generally, in a solid-state imaging device in an imaging unit used for monitoring applications and the like, a length thereof in a horizontal direction thereof may be longer than a length thereof in vertical direction thereof in many cases. Therefore, when the imaging unit rotates around an optical axis, an imaging range of the imaging unit changes. For this reason, as illustrated in FIGS. 10A and 10B, a size of the overlapping range 335 changes in accordance with a rotation angle of the imaging unit.

Although three functions such as a pan driving mechanism, a tilt driving mechanism, and a rotation driving mechanism are all provided together with a first driving mechanism and a second driving mechanism in this practical example, each of the first driving mechanism and the second driving mechanism may have a part of the above three functions. That is to say, for example, with regard to a rotation function, a rotation unit configured to rotate a corresponding one imaging unit of the first imaging unit and the second imaging unit about an optical axis of at least one of the first imaging unit and the second imaging unit may be provided.

Fourth Embodiment

FIGS. 11A and 11B and FIGS. 12A and 12B illustrate an imaging device 400 in a fourth embodiment. The imaging device 400 in the fourth embodiment and the imaging device 100 illustrated in the first embodiment differ in that a configuration of a first driving mechanism and a second driving mechanism and a configuration of a first imaging unit and a second imaging unit in the imaging device 400 in the fourth embodiment are different from those of the imaging device 100 illustrated in the first embodiment. The imaging device 400 in the fourth embodiment has a configuration in which not only imaging directions of a first imaging unit 410 and a second imaging unit 420 but also an imaging range through zooming can be controlled. To be specific, imaging optical systems in the imaging units have zoom lenses movable in an optical axis direction and imaging ranges of the imaging units are variably controlled when a first driving mechanism 411 (not shown) and a second driving mechanism 412 (not shown) drive the zoom lenses.

Also, when a size (an area) of an overlapping range 435 between an imaging range 415 of the first imaging unit 410 and an imaging range 425 of the second imaging unit 420 is equal to or more than a first threshold value, a wide-angle image signal 434 is generated and when the size (the area) of the overlapping range 435 between the imaging range 415 of the first imaging unit 410 and the imaging range 425 of the second imaging unit 420 is less than the first threshold value, the wide-angle image signal 434 is not generated.

FIGS. 11A, 11B, 12A, and 12B are diagrams illustrating the first imaging range 415 of the first imaging unit 410, the second imaging range 425 of the second imaging unit 420, and the overlapping range 435.

Figure 11A:
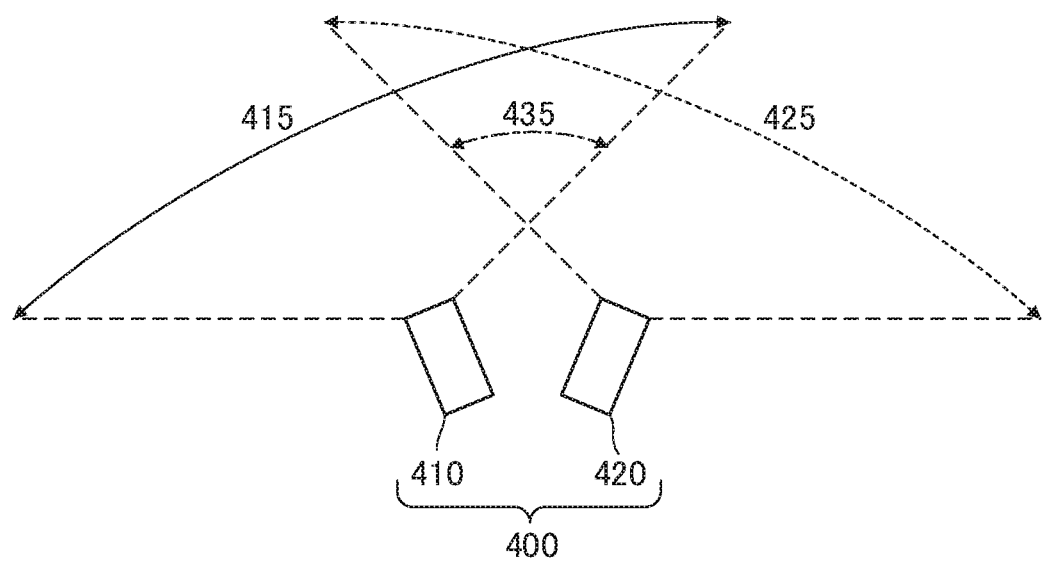
FIGS. 11A and 11B are diagrams illustrating an example of the imaging ranges and overlapping ranges of imaging units in an imaging device in a fourth embodiment.
Figure 11B:
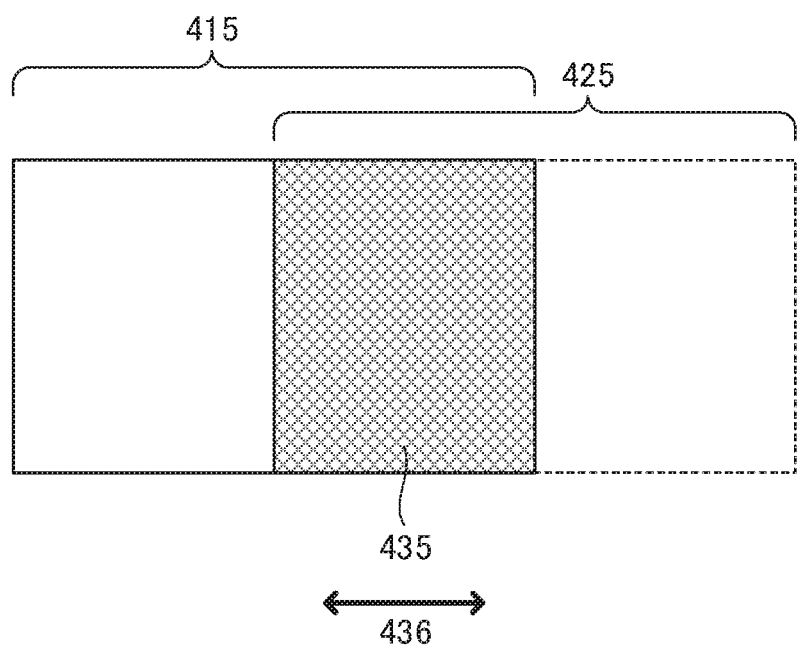
Figure 12A:
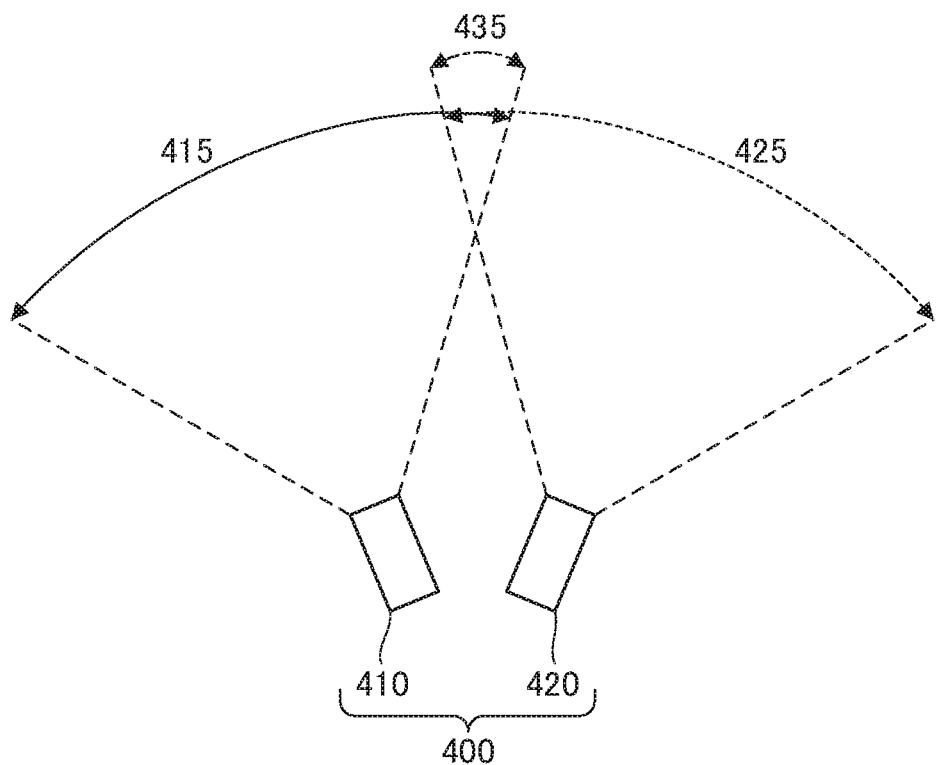
FIGS. 12A and 12B are diagrams illustrating another example of the imaging range and the overlapping ranges of imaging units in an imaging device in the fourth embodiment.
Figure 12B:
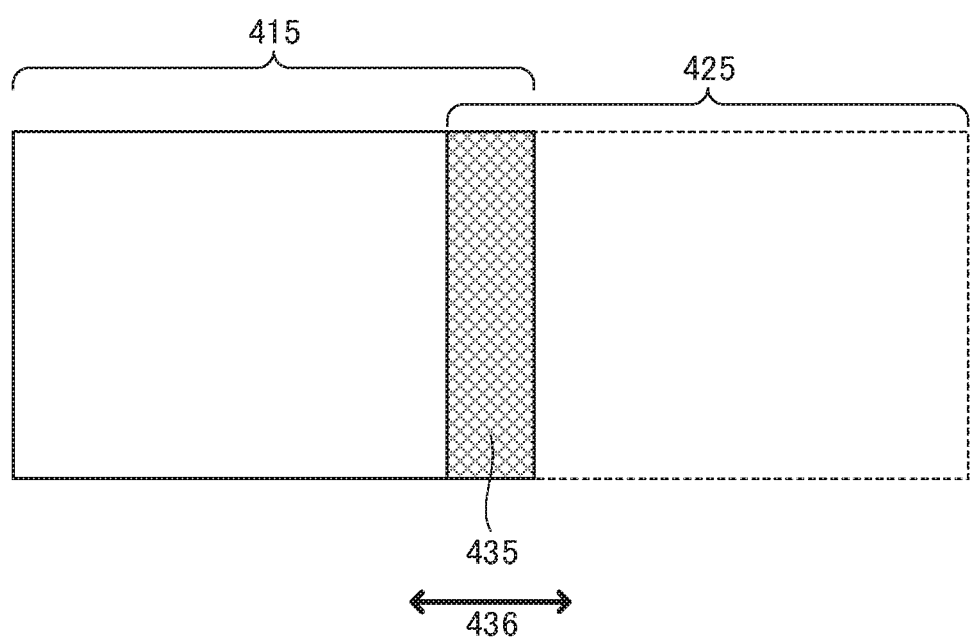

FIGS. 11A and 11B illustrate a case in which the overlapping range 435 is equal to or more than a first threshold value 436 and FIGS. 12A and 12B illustrate a case in which the overlapping range 435 is less than the first threshold value 436. In FIGS. 11A, 11B, 12A, and 12B, the overlapping range 135 corresponds to a hatched region.

As can be seen from FIGS. 11A, 11B, 12A, and 12B, when the imaging range (an angle of view) 415 of the first imaging unit 410 and the imaging range (an angle of view) 425 of the second imaging unit 420 increase, the overlapping range 435 increases. To be specific, when a length of the imaging range in a rotation direction from an optical axis of the first imaging unit 410 toward an optical axis of the second imaging unit 420 increases (when the angle of view increases), the overlapping range 435 increases.

Therefore, in the imaging device 400 in the fourth embodiment, a sum of a length of the imaging range of the first imaging unit 410 and a length of the imaging range of the second imaging unit 420 in the rotation direction from the optical axis of the first imaging unit 410 toward the optical axis of the second imaging unit 420 is obtained. Thus, a determination concerning whether to generate a wide-angle image signal may be performed.

To be specific, when the sum of the lengths of the imaging ranges is, for example, equal to or less than a predetermined threshold value, a wide-angle image signal may be generated and when the sum of the lengths of the imaging ranges is larger than the predetermined threshold value, the wide-angle image signal may not be generated. That is to say, assuming that directions of the first imaging unit 410 and the second imaging unit 420 in a pan direction thereof are fixed, if a sum of angles of view of the first imaging unit 410 and the second imaging unit 420 is equal to or more than a predetermined value, an overlapping range increases. Therefore, in this case, a wide-angle image signal is generated. In addition, if the sum of the angles of view of the first imaging unit 410 and the second imaging unit 420 is smaller than the predetermined value, the overlapping range decreases. Thus, the wide-angle image signal is not generated.

In addition to a zoom driving mechanism, as in the first to third embodiments, the first driving mechanism and the second driving mechanism may have only a part of the pan driving mechanism, the tilt driving mechanism, and the rotation driving mechanism. That is to say, a zoom unit configured to change an imaging range of at least one of the first imaging unit and the second imaging unit may be provided.

Fifth Embodiment

In a fifth embodiment, a user interface configure to control imaging directions or imaging ranges of a first imaging unit and a second imaging unit in an imaging device will be described. Although a case in which an imaging direction of an imaging device is controlled in a pan direction thereof will be described below as an example as in the imaging device illustrated in the first embodiment, the same user interface can also be used in the case of a direction other than the pan direction.

Figure 13A:
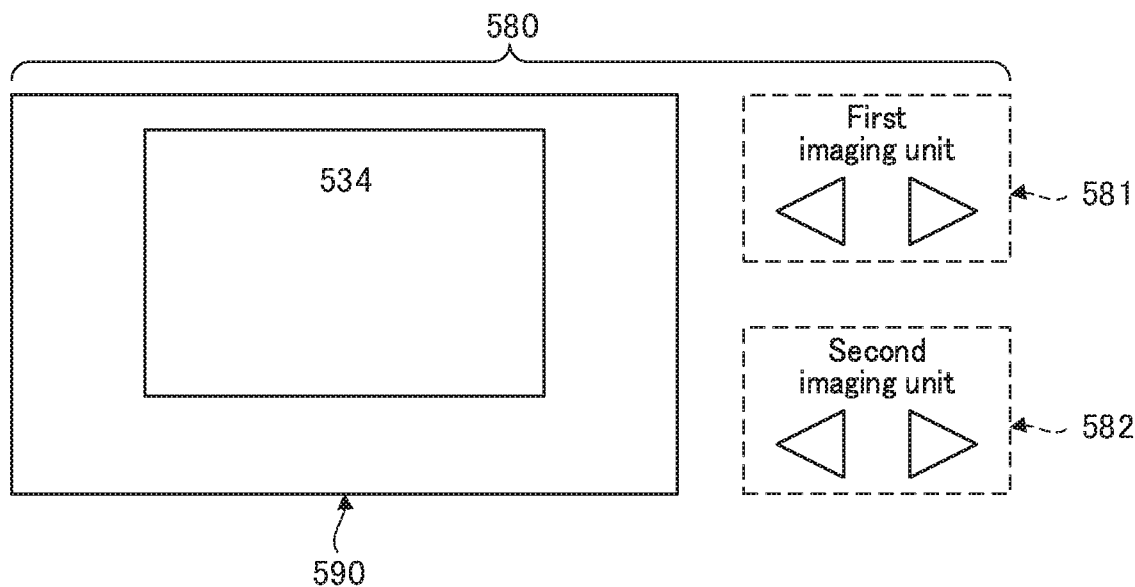
FIGS. 13A and 13B are diagrams illustrating a user interface of an imaging device in a fifth embodiment.
Figure 13B:
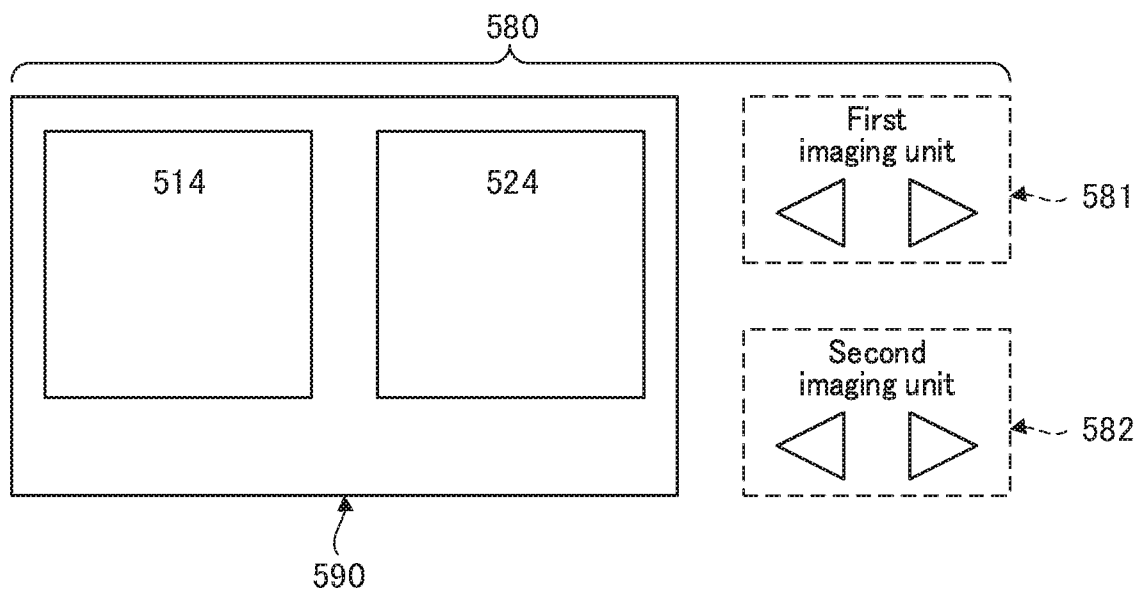

FIGS. 13A and 13B are diagrams for explaining a user interface 580 of an imaging device 500 illustrated in the fifth embodiment. The user interface 580 includes cursors 581 and 582 configured to control imaging directions of a first imaging unit 510 and a second imaging unit 520 in the imaging device 500 in FIG. 14 and a display unit 590 configured to display an image signal acquired using the imaging units. The user interface 580 may be provided separately on a client device 180 side or may be provided integrally in the imaging device 100.

The imaging direction may be controlled not only using a cursor but also using dragging a range desired to image with a mouse or a touch panel or by identifying a character or a number using a character input interface such as a keyboard.

When a size of an overlapping range 535 between an imaging range 515 of the first imaging unit 510 and an imaging range 525 of the second imaging unit 520 is equal to or more than a first threshold value, as illustrated in FIG. 13A, a wide-angle image signal 534 is displayed on the display unit 590.

On the other hand, when the size of the overlapping range 535 is less than a first threshold value, as illustrated in FIG. 13B, the first image signal 514 and the second image signal 524 are independently displayed side by side (hereinafter referred to as a "non-wide-angle image display"). In the display unit, the first image signal 514 may be displayed on the right and the second image signal 524 may be displayed on the left. Furthermore, the deviation may be arranged in an upward/downward direction instead of a leftward/rightward direction.

Here, it is desirable that the first image signal 514 and the second image signal 524 be displayed side by side in the same order in accordance with the imaging directions of the first imaging unit 510 and the second imaging unit 520. That is to say, when the first imaging unit 510 faces the left and the second imaging unit 520 faces the right, on the display unit 590, an arrangement is performed in the same order so that the first image signal 514 is arranged on the left side and the second image signal 524 is arranged on the right side.

Although the first imaging unit 510 and the second imaging unit 520 are not combined in the non-wide-angle image display mode, the first imaging unit 510 and the second imaging unit 520 may be arranged side by side and displayed to be adjacent to each other without a gap. Alternatively, the first imaging unit 510 and the second imaging unit 520 may be arranged with a gap.

First, in a state in which the wide-angle image signal 534 is displayed on the display unit 590, the user changes the imaging direction of the first imaging unit 510 or the second imaging unit 520 and a size of the overlapping range 535 is less than the first threshold value. At this time, it is desirable that the imaging device 500 return one of the following responses.

Figure 14A:
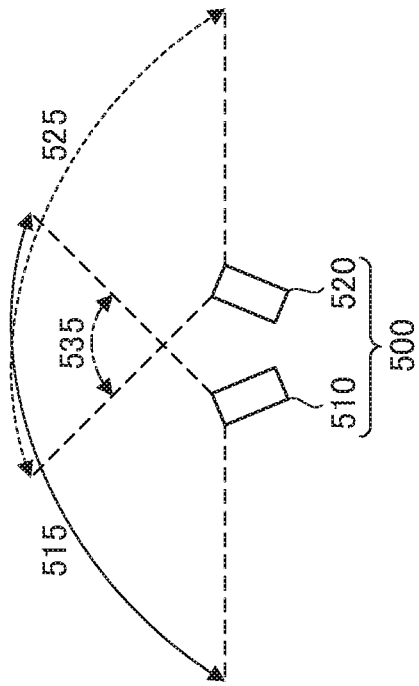
FIGS. 14A-14D are diagrams illustrating an example of a display screen and the movement of an imaging unit when the imaging unit transitions from a wide-angle image display mode.
Figure 14C:
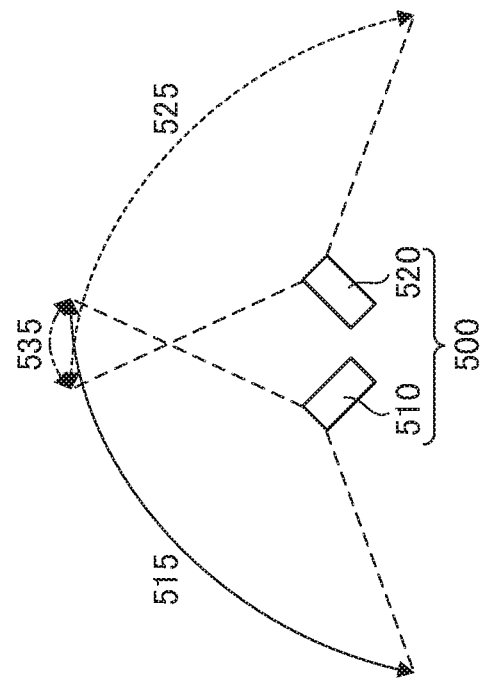
Figure 14B:
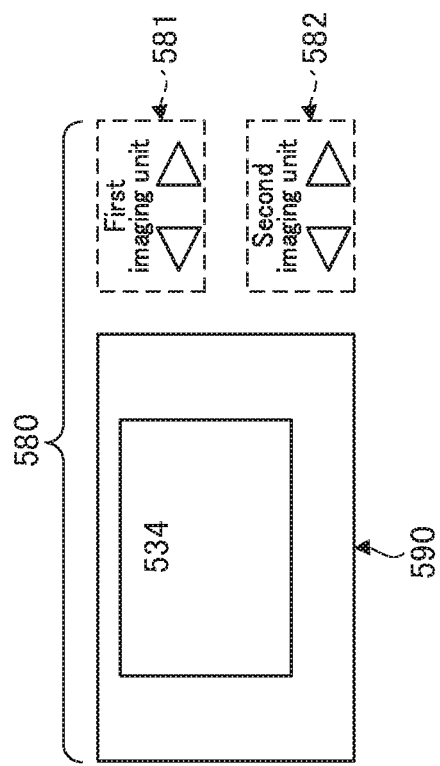
Figure 14D:
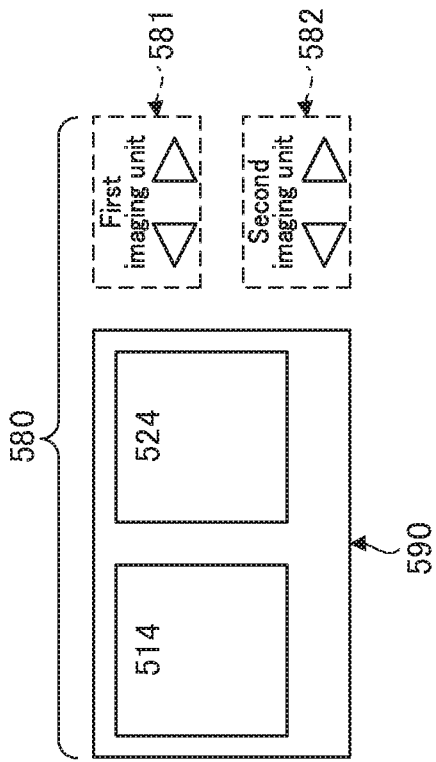

As illustrated in FIGS. 14A, 14B, 14C, and 14D, a first response is a response for changing the direction of the imaging unit as instructed by the user. By performing this response, it is possible to change the direction of the imaging unit as intended by the user. FIGS. 14A and 14B illustrate a user interface and FIGS. 14C and 14D illustrate imaging directions and imaging ranges 515 and 525 of the imaging units 510 and 520 at that time.

However, when this response is provided, a type of image displayed on the display unit changes before and after the direction of the imaging unit changes. That is to say, before the direction of the imaging unit changes, the wide-angle image signal 534 has been displayed. On the other hand, after the direction of the imaging unit changes, a non-wide-angle image signal is displayed. For this reason, the user is likely to feel strange.

Figure 15A:
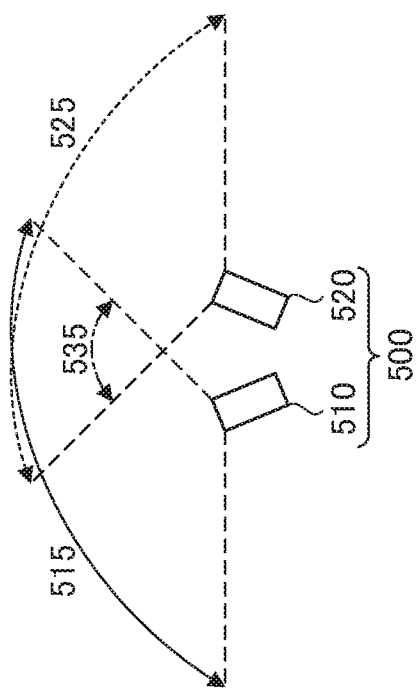
FIGS. 15A-15D are diagrams illustrating another example of the display screen and the movement of the imaging unit when the imaging unit transitions from the wide-angle image display mode.
Figure 15C:
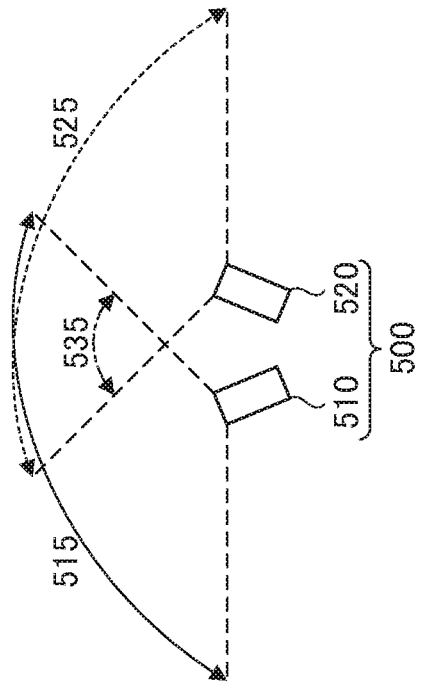
Figure 15B:
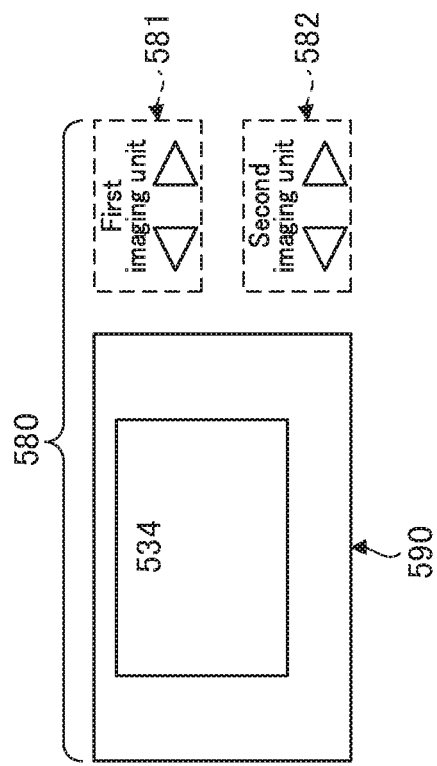
Figure 15D:
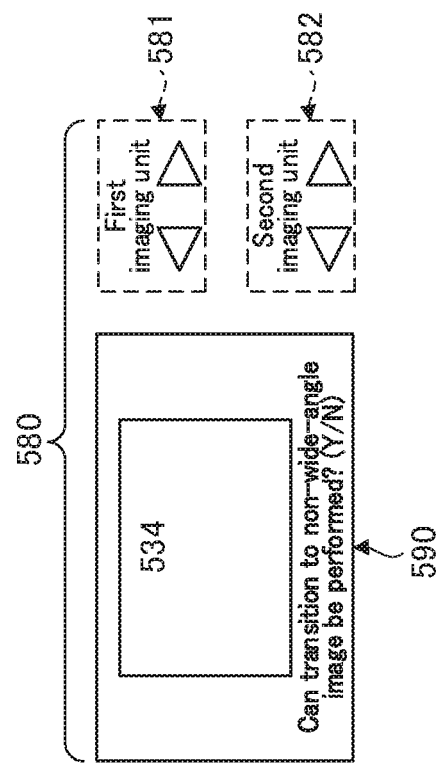

Thus, as a second response, as illustrated in FIGS. 15A, 15B, 15C, and 15D, before the direction of the imaging unit is changed, there is a response that asking concerning whether a transition from the wide-angle image signal 534 to the non-wide-angle image signal is to be performed by displaying a dialog box or the like. FIGS. 15A and 15B illustrate a user interface and FIGS. 15C and 15D illustrate imaging directions and imaging ranges 515 and 525 of the imaging units 510 and 520 at that time.

As a result of asking the user, when there is a response from the user that a non-wide-angle image can be transitioned, the direction of the imaging unit is changed and an image displayed on the display unit 590 is changed from a wide-angle image signal to a non-wide-angle image signal. On the other hand, when there is a response from the user that a transition from a wide-angle image signal to a non-wide-angle image signal cannot be performed, the wide-angle image signal is kept displayed without changing the direction of the imaging unit. When the second response as described above is used, it is possible to eliminate the discomfort of changing from the wide-angle image signal to the non-wide-angle image signal.

Figure 16C:
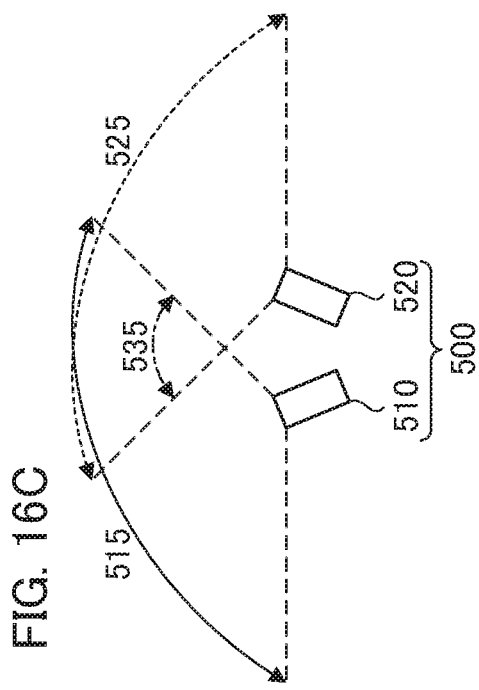
FIGS. 16A-16D are diagrams illustrating an example of still another example of the display screen and the movement of the imaging unit when the imaging unit transitions from the wide-angle image display mode.
Figure 16D:
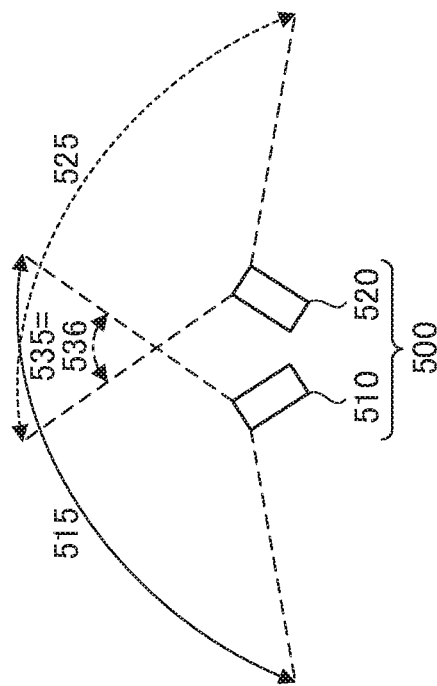
Figure 16A:
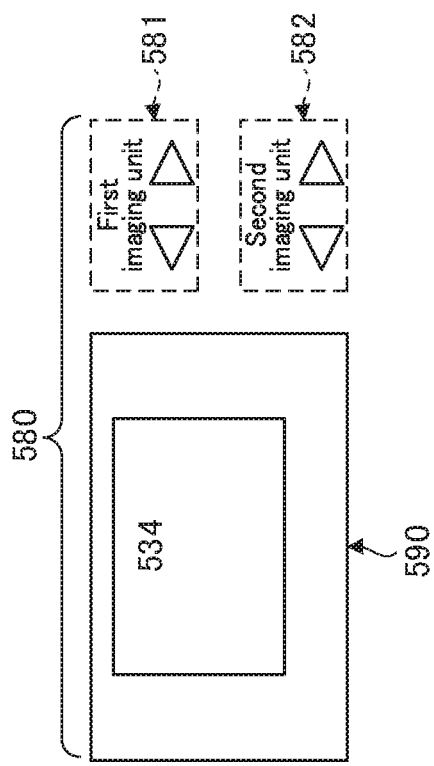
Figure 16B:
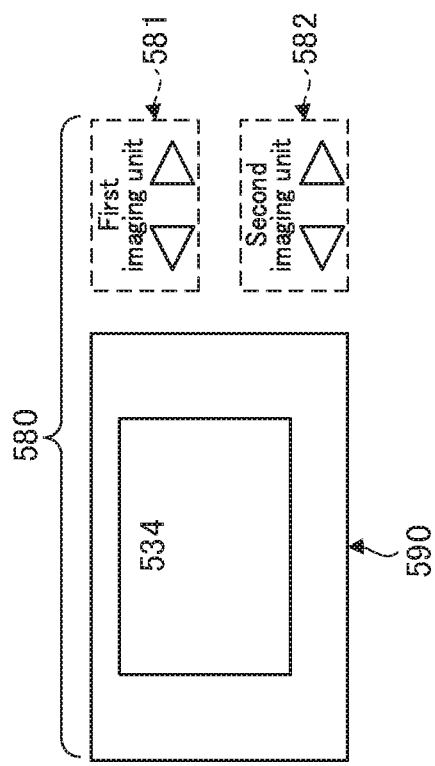

Also, as a third response, there is a response that it is possible to change the direction of the imaging unit only within a range in which the wide-angle image signal can be displayed. That is to say, as illustrated in FIGS. 16A, 16B, 16C, and 16D, it is possible to change the direction of the imaging unit until the size of the overlapping range 535 is the first threshold value. FIGS. 16A and 16B illustrate a user interface and FIGS. 16C and 16D illustrate imaging directions and imaging ranges 515 and 525 of the imaging units 510 and 520 at that time.

At this time, since the size of the overlapping range 535 is equal to or more than the first threshold value, an image displayed on the display unit 590 is maintained as a wide-angle image. The use of the third response can also eliminate the discomfort of changing from a wide-angle image to a non-wide-angle image.

When the third response is used, it is more desirable to use the third response together with the second response. That is to say, this is a response that the direction of the imaging unit is changed until the size of the overlapping range 535 reaches the first threshold value and then a dialog box or the like is displayed to request the user's instruction concerning whether to further change the direction of the imaging unit. For the user who wants to change the imaging direction while keeping the wide-angle image, it is possible to change the imaging direction as much as possible and to change the imaging direction to a desired imaging direction for the user who wants to change the imaging direction even after transitioning to the non-wide-angle image.

Figure 17A:
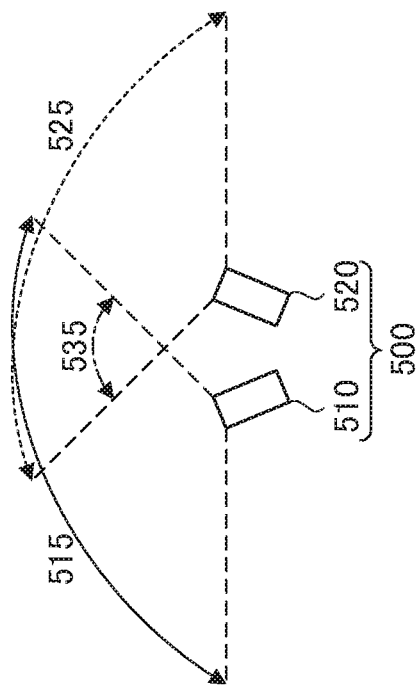
FIGS. 17A-17D are diagrams illustrating an example of yet another example of the display screen and the movement of the imaging unit when the imaging unit transitions from the wide-angle image display mode.
Figure 17C:
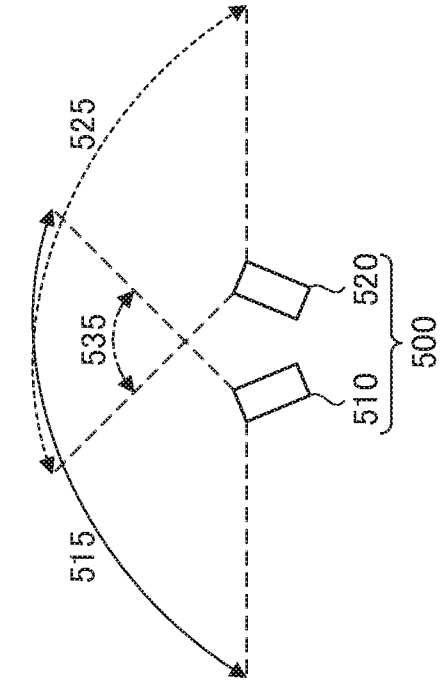
Figure 17B:
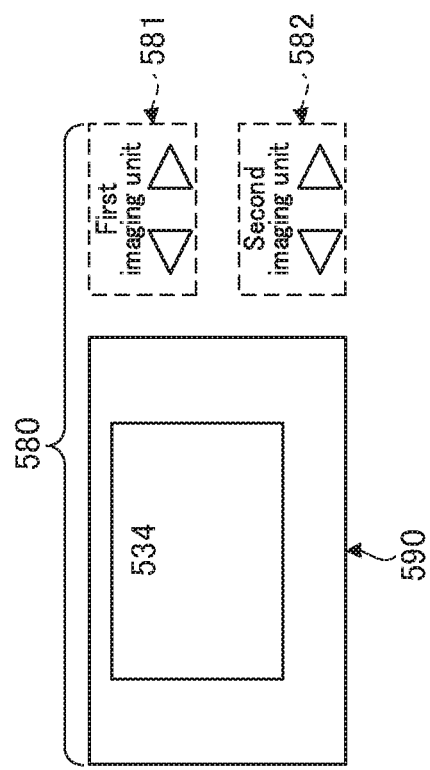
Figure 17D:
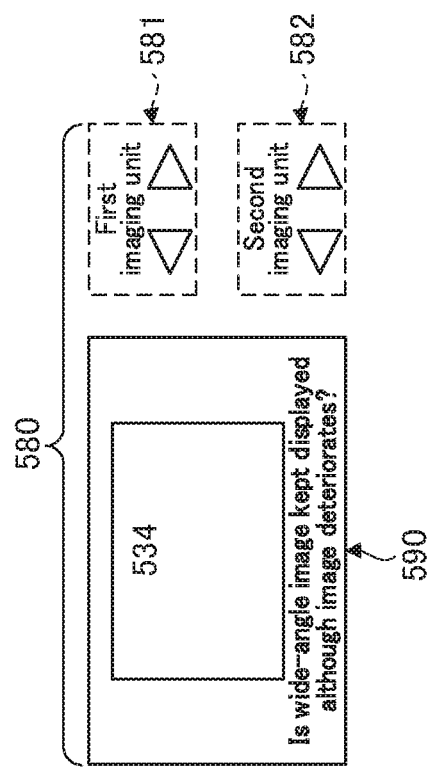

As a fourth response, there is a response that the user selects whether to display a wide-angle image having a low accuracy or a non-wide-angle image. That is to say, when the user selects the displaying of the wide-angle image signal having a low accuracy, the wide-angle image signal is continuously displayed even after the direction of the imaging unit has been changed and when the user selects the transitioning to the non-wide-angle image signal, the direction of the imaging unit is changed and at the same time, the non-wide-angle image signal is displayed. FIGS. 17A and 17B illustrate a user interface and FIGS. 17C and 17D illustrate imaging directions and imaging ranges 515 and 525 of the imaging units 510 and 520 at that time.

As described above, when the size of the overlapping range 535 is less than the first threshold value, it is difficult to obtain an amount of positional shifting having a high accuracy. Thus, it is difficult to obtain a wide-angle image signal having a high quality. However, the user who can tolerate an amount of positional shifting having a low accuracy may want to display the wide-angle image signal even if the accuracy is low in some cases. In such a case, it is desirable to use the fourth response.

When the size of the overlapping range 535 is almost zero, that is, when the imaging range of the first imaging unit and the imaging range of the second imaging unit do not overlap, it is impossible to obtain an amount of positional shifting.

In this case, it is not possible to display a wide-angle image signal. Thus, it is necessary to perform the transitioning to a non-wide-angle image display even with the fourth response.

At this time, when there is a response indicating a prohibition instruction from the user that a transition from a wide-angle image display to a non-wide-angle image display need not be performed, it is desirable that the direction of the imaging unit can be changed only until the overlapping range is zero.

Also, it is more desirable that the user select whether to change the direction of the imaging unit until a wide-angle image signal having a high accuracy is obtained by combining the third response and the fourth response or to change the direction of the imaging unit while a wide-angle image signal having a low accuracy is also allowed using a dialog box or the like. In this case, an allowable size of the overlapping range changes in accordance with the user's selection.

A case in which the imaging direction of the first imaging unit 510 or the second imaging unit 520 is changed in a state in which the non-wide-angle image is displayed on the display unit 590 will be described below.

It is assumed that the user performs driving so that the size of the overlapping range 535 is equal to or more than the first threshold value in a state in which the non-wide-angle image is displayed on the display unit 590.

At this time, it is desirable that the imaging device 500 return one of the following responses.

A first response is a response that the direction of the imaging unit is changed as instructed by the user, as illustrated in FIGS. 18A, 18B, 18C, and 18D. By performing this response, it is possible to change the direction of the imaging unit as intended by the user. FIGS. 18A and 18B illustrate a user interface and FIGS. 18C and 18D illustrate imaging directions and imaging ranges 515 and 525 of the imaging units 510 and 520 at that time.

However, when this response is provided, the type of image displayed on the display unit changes before and after the direction of the imaging unit is changed. That is to say, before the direction of the imaging unit is changed, the non-wide-angle image signal is display. On the other hand, after the direction of the imaging unit is changed, the wide-angle image signal 534 is displayed. For this reason, the user is likely to feel uncomfortable.

Figure 19A:
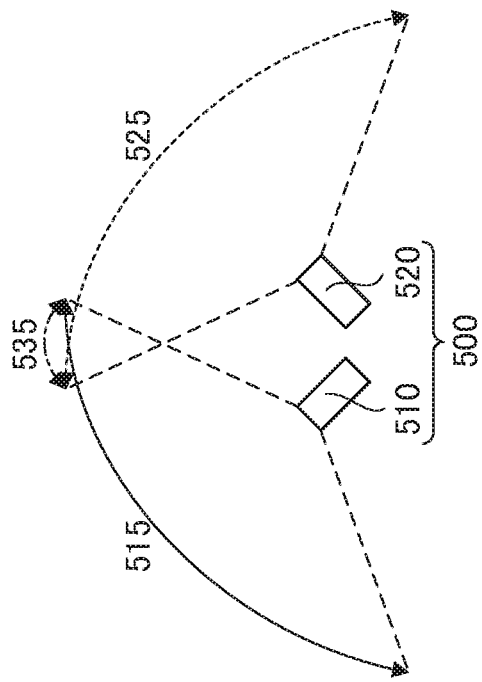
FIGS. 19A-19D are diagrams illustrating another example of the display screen and the movement of the imaging unit when the imaging unit transitions from the non-wide-angle image display mode.
Figure 19B:
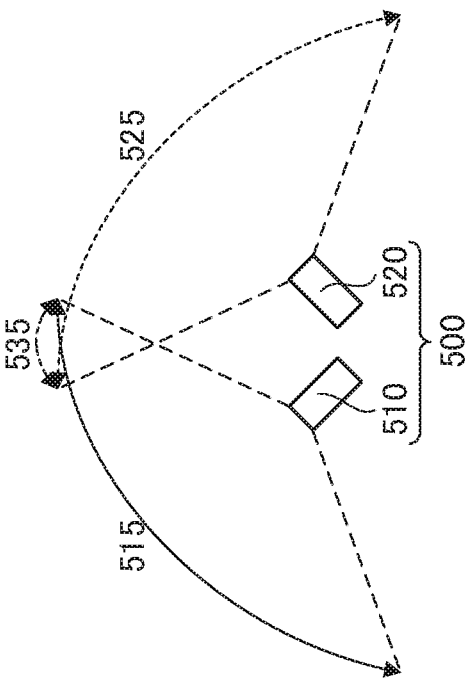
Figure 19C:
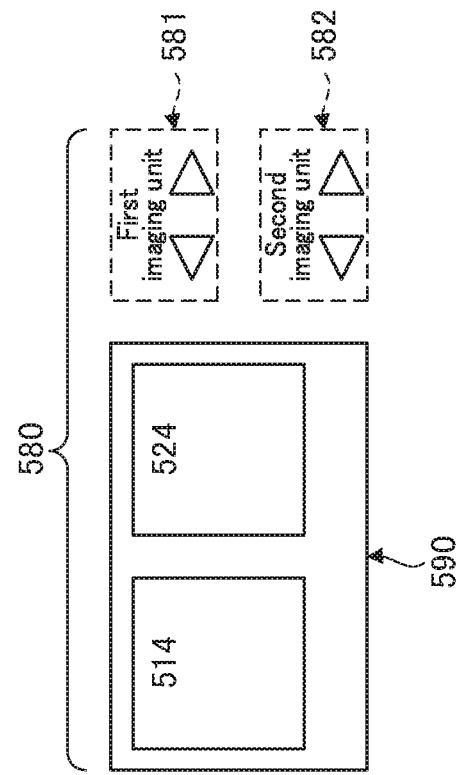
Figure 19D:
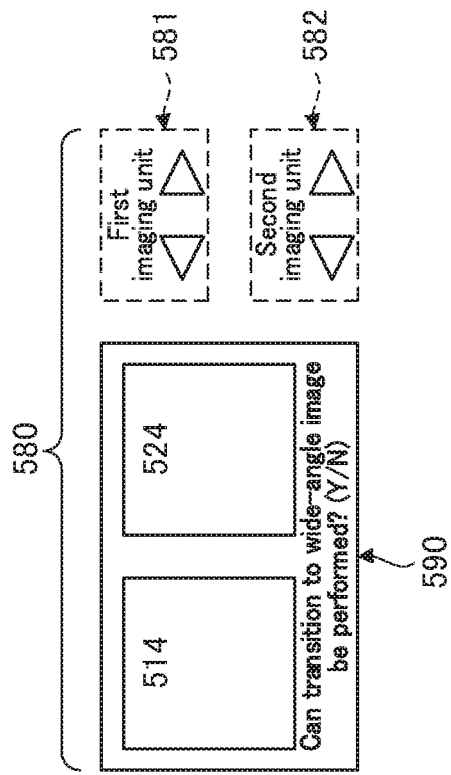

Thus, as a second response, as illustrated in FIGS. 19A, 19B, 19C, and 19D, before the direction of the imaging unit is changed, there is a response that asking concerning whether to transition from a non-wide-angle image display mode to a wide-angle image display mode using a dialog box or the like. FIGS. 19A and 19B illustrate a user interface and FIGS. 19C and 19D illustrate imaging directions and imaging ranges 515 and 525 of the imaging units 510 and 520 at that time.

As a result of asking the user, when there is a response from the user that the display can transition to the wide-angle image display, the direction of the imaging unit is changed and the image displayed on the display unit 590 is changed from the non-wide-angle image display mode to the wide-angle image display mode.

On the other hand, when there is a response from the user that the mode need not to transition from the non-wide-angle image display mode to the wide-angle image display mode, the direction of the imaging unit is not changed and the non-wide-angle image is kept displayed.

When the second response is used, it is possible to eliminate the discomfort when the mode is changed from the non-wide-angle image display mode to the wide-angle image display mode.

When there is a response (a prohibition instruction) from the user that the mode need not to transition from the non-wide-angle image display mode to the wide-angle image display mode, the non-wide-angle image may be kept displayed while the direction of the imaging unit is changed. This is because when the overlapping range is equal to or more than the first threshold value, it is desirable to display a wide-angle image when importance is placed on visibility of the overlapping range, but a non-wide-angle image can also be displayed.

Subsequently, it is assumed that, when the non-wide-angle image is displayed on the display unit 590, the user performs driving so that the size of the overlapping range 535 is smaller than the first threshold value and equal to or more than the second threshold value. The second threshold value is smaller than the first threshold value, but is preferably, for example, half or more of the first threshold value.

At this time, it is desirable that the imaging device 500 return one of the following responses.

As illustrated in FIGS. 18A, 18B, 18C, and 18D, a first response is a response that the direction of the imaging unit is changed as instructed by the user. By performing this response, it is possible to change the direction of the imaging unit as intended by the user. In this case, since the overlapping range is kept smaller than the first threshold value, there is no problem that the type of image displayed on the display unit changes before and after the direction of the imaging unit is changed.

However, as described above, when importance is placed on the visibility of the overlapping range, it is desirable to display a wide-angle image. Thus, it is desirable to provide options for displaying the wide-angle image signal to the user. That is to say, as illustrated in FIGS. 20A, 20B, 20C, and 20D, the second response is a response that displaying indicating the fact that "if the direction of the imaging unit is made a little closer, a wide-angle image can be displayed. Do you bring the imaging unit closer?" is provided for the user while the direction of the imaging unit is changed as instructed by the user.

Figure 20A:
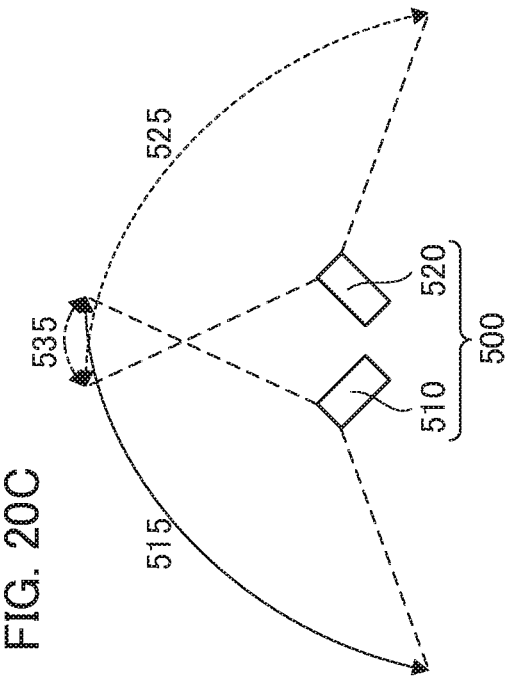
FIGS. 20A-20D are diagrams illustrating still another example of the display screen and the movement of the imaging unit when the imaging unit transitions from the non-wide-angle image display mode.
Figure 20C:
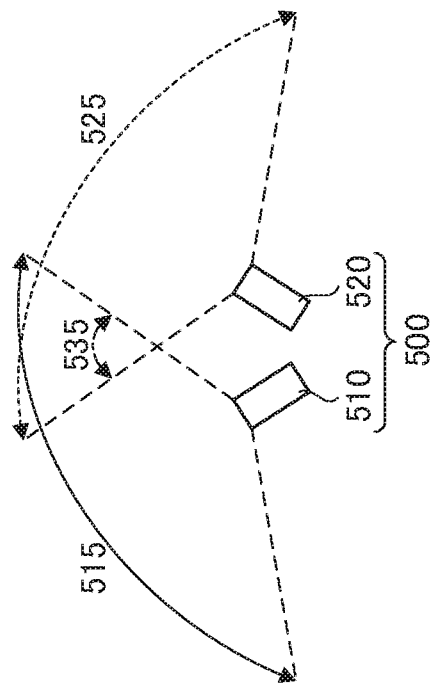
Figure 20B:
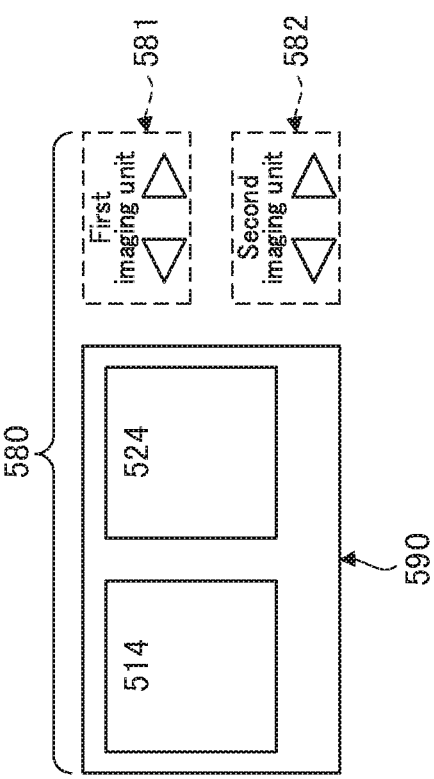
Figure 20D:
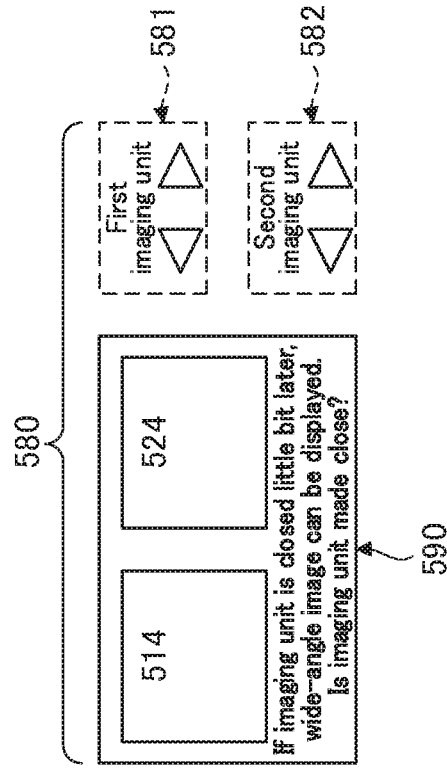

FIGS. 20A and 20B illustrate a user interface and FIGS. 20C and 20D illustrate imaging directions and imaging ranges 515 and 525 of the imaging units 510 and 520 at that time.

When the user responds that he or she wants a wide-angle image, the wide-angle image is kept displayed while the direction of the imaging unit is further changed until the overlapping range is equal to or more than the first threshold value. On the other hand, when the user returns a response indicating that the non-wide-angle image can be kept as it is, the non-wide-angle image is displayed while the direction of the imaging unit is kept as it is.

At this time, the first response or the second response is changed depending on whether the user has changed the direction of the imaging unit to increase the overlapping range or has changed the direction to decrease the overlapping range.

When the user changes the direction of the imaging unit so that the overlapping range increases, it is expected that the user wants to image a near imaging range with the first imaging unit and the second imaging unit. Thus, options in which a wide-angle image can be displayed by providing the second response are presented.

On the other hand, when the user changes the direction of the imaging unit so that the overlapping range decreases, it is expected that the user wants to image different imaging ranges with the first imaging unit and the second imaging unit. Thus, the first response is provided.

Figure 21:
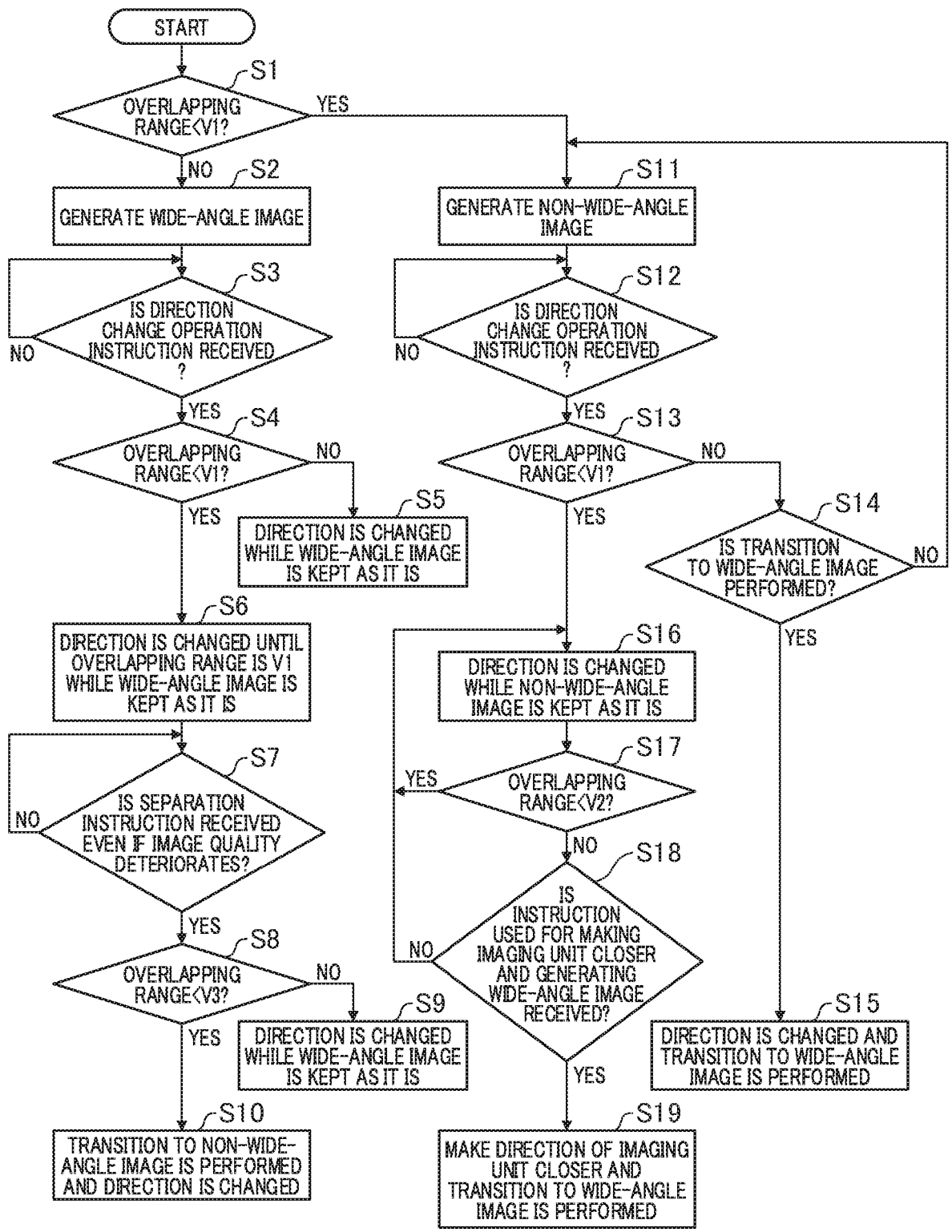
FIG. 21 is a flowchart for describing an operation example of a practical example.

FIG. 21 is a flowchart for describing an operation example of the above practical example below.

In FIG. 21, in Step S1, a determination concerning whether the overlapping range between the imaging ranges of the first imaging unit and the second imaging unit is smaller than a first threshold value V1 is performed. In addition, when the determination result is No, in Step S2, a wide-angle image is generated and displayed.

After that, in Step S3, a determination concerning whether an operation to change a direction of at least one of the first imaging unit and the second imaging unit is performed. When the determination result is No, the process returns to the process of Step S3. When the determination result is Yes, in Step S4, a determination concerning whether the overlapping range is smaller than the first threshold value V1 is performed. In addition, when the determination result is No, the process proceeds to the process of Step S5 and the imaging direction is changed without changing the wide-angle image.

When the determination result in Step S4 is Yes, the process proceeds to the process of Step S6 and the direction of at least one of the first imaging unit and the second imaging unit is changed so that the overlapping range is kept at the threshold value V1 as it is in the advanced wide-angle image. Furthermore, in Step S7, a dialog box "Do you release the direction even if the image quality is changed?" is displayed, and as a result, it is determined whether the release instruction has been received. Moreover, when the determination result is No in Step S7, the process returns to the process of Step S7.

When the determination result is Yes, the process proceeds to the process of Step S8 and it is determined that the overlapping range is smaller than a third threshold value V3. Here, V3 is a threshold value that makes it difficult to generate a wide-angle image, for example, is close to zero. When the determination result in Step S8 is No, the process proceeds to the process of Step S9 and the direction of at least one of the first imaging unit and the second imaging unit is changed while the wide-angle image is displayed. When the determination result in Step S8 is Yes, the process proceeds to the process of Step S10, the non-wide-angle image is displayed, and the direction of at least one of the first imaging unit and the second imaging unit is changed.

On the other hand, when the determination result in Step S1 is Yes, the process proceeds to the process of Step S11 and the non-wide-angle image is generated and displayed. Furthermore, in Step S12, it is determined whether an operation to change the direction of the at least one of the first imaging unit and the second imaging unit is performed.

When the determination result is No, the process returns to the process of Step S12. When the determination result is Yes, in Step S13, a determination concerning whether the overlapping range is smaller than the first threshold value V1 is performed. In addition, if the determination result is No, the process proceeds to the process of Step S14 and asking concerning whether to transition to the wide-angle image is performed using a dialog box.

When the determination result in Step S14 is No, the process returns to the process of Step S11. When the determination result in Step S14 is Yes, the process proceeds to the process of Step S15, the direction of at least one of the first imaging unit and the second imaging unit is changed, and a transition to the wide-angle image display is performed.

When the determination result in Step S13 is Yes, the process proceeds to the process of Step S16 and the direction of at least one of the first imaging unit and the second imaging unit is changed without changing the non-wide-angle image.

Also, in Step S17, a determination concerning whether the overlapping range is smaller than a second threshold value V2 is performed. In addition, if the determination result is Yes, the process proceeds to the process of Step S16. When the determination result in Step S17 is No, the process proceeds to the process of Step S18 and a dialog box "Would you like to make the direction of the imaging unit closer to set to a wide-angle image?" is displayed and as a result, when the instruction of No is provided, the process returns to the process of Step S16. When the instruction of Yes is provided in Step S18, in Step S19, the direction of at least one of the first imaging unit and the second imaging unit is changed so that the imaging unit is made close and the display is switched to the wide-angle image display.

As described above, according to the practical example, since the wide-angle image display mode and the non-wide-angle image display mode are appropriately switched in accordance with the overlapping range (amount) of the image obtained from the first imaging unit and the image obtained from the second imaging unit, a user-friendly display is obtained. Of course, this practical example can also be applied to a case in which three or more of imaging units are provided.

In this case, in the non-wide-angle image display mode, the images of a plurality of imaging units are arranged side by side without being combined so that it is possible to display an image which is comfortable for the user.

Sixth Embodiment

Although according to one of the previous embodiments, depending on a size of an overlapping range 125 between an imaging range 115 of the first imaging unit 110 and an imaging range 125 of the second imaging unit 120, it is determined whether the wide-angle image signal is displayed or the independent images are displayed side by side.

In the sixth embodiment, the control unit 130 detects angular positions or directions of the first imaging unit 110 and the second imaging unit 120 in a peripheral surface of the imaging device 100, so that it is determined whether the wide-angle image signal is displayed or the independent images are displayed side by side, based on a relation between the angular positions or directions. Here, for simplification, it is assumed that the first imaging unit 110 and the second imaging unit 120 have the same imaging range or angle.

Specifically, for example, the control unit 130 detects the angular positions of the first imaging unit and the second imaging unit based on the numbers of steps from a predetermined initial position of a stepping motor for changing directions of the first imaging unit and the second imaging unit. As far as the angular positions can be detected, any other detecting method may be used.

Then the control unit 130 calculates the difference between the angular positions of the first imaging unit and the second imaging unit, and if the difference of the angular positions is less than a predetermined value, then the wide-angle image signal is displayed. If the difference of the angular positions is not less than the predetermined value, then independent images are displayed side by side.

In this connection, angular positions or directions of respective imaging units are detected by using the number of steps of the step motor, an encoder may be arranged to detect the angular positions or directions of respective imaging units.

As described above, the present invention has been described in detail on the basis of the preferred embodiments. However, the present invention is not limited to the above embodiments and various modifications are possible on the basis of the gist of the present invention. It is not excluded from the scope of the invention.

Also, a part or all of the control in the present embodiments may be supplied to an imaging device over a network or various storage media using a computer program configured to realize the functions of the above-described embodiments. Furthermore, a computer (or a central process unit (CPU), a microprocessor unit (MPU), or the like) in the imaging device may read and execute a program. In this case, the program and a storage medium configured to store the program constitutes the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-91101 filed on May 14, 2019, which is hereby incorporated by reference herein in its entirety.

What is claimed is:

1. An imaging device, comprising:
a first imaging unit and a second imaging unit, each of which is movable in a predetermined direction;
a hardware processor; and
a memory for storing instructions to be executed by the hardware processor, wherein, when the instructions stored in the memory are executed by the hardware processor, the imaging device functions as:
a combination processing unit configured to combine a first image obtained by the first imaging unit and a second image obtained by the second imaging unit to generate a wide-angle image;
a determination unit configured to determine whether or not to generate the wide-angle image by the combination processing unit, based on an overlapping range between an imaging range of the first imaging unit and an imaging range of the second imaging unit; and
an output unit configured to switch between a) the wide-angle image and b) at leat one of the first image and the second image based on the overlapping range changed by a movement of at least one of the first imaging unit and the second imaging unit in the predetermined direction and output a) the wide-angle image or b) at least one of the first image and the second image.

2. The imaging device according to claim 1, wherein, when the instructions stored in the memory are executed by the hardware processor, the imaging device functions as a control unit configured to perform control so that, when the determination unit determines that the overlapping range between the imaging range of the first imaging unit and the imaging range of the second imaging unit is equal to or more than a first threshold value, the wide-angle image is generated in the combination processing unit, and when the determination unit determines that the overlapping range is less than the first threshold value, the wide-angle image is not generated in the combination processing unit.

3. The imaging device according to claim 2, wherein the first threshold value is determined using the number of pixels included in the overlapping range.

4. The imaging device according to claim 2, wherein the first threshold value is such that an overlapping range is 20% or more with respect to a relatively narrower imaging range of a first imaging range and a second imaging range.

5. The imaging device according to claim 2, wherein the imaging device has a third imaging unit, and when an overlapping range between imaging ranges of two adjacent imaging units among the imaging units is equal to or more than a first threshold value, the wide-angle image is generated by combining images obtained by the imaging units, and when the overlapping range between the imaging ranges of the two adjacent imaging units is less than the first threshold value, the images obtained by the imaging units are not combined.

6. The imaging device according to claim 1, wherein, when the instructions stored in the memory are executed by the hardware processor, the imaging device functions as a driving unit configured to control at least one of the first imaging unit and the second imaging unit, and
wherein the driving unit includes a zoom unit configured to change the imaging range of at least one of the first imaging unit and the second imaging unit.

7. The imaging device according to claim 1, wherein, when the instructions stored in the memory are executed by the hardware processor, the imaging device functions as a driving unit configured to control at least one of the first imaging unit and the second imaging unit, and
wherein the driving unit includes a rotation unit configured to rotate a corresponding one imaging unit of the first imaging unit and the second imaging unit about at least one optical axis of the first imaging unit and the second imaging unit.

8. The imaging device according to claim 1, wherein the predetermined direction is a circumferential direction, wherein the determination unit detects a position of the first imaging unit in the predetermined direction and a position of the second imaging unit in the predetermined direction.

9. The imaging device according to claim 8, wherein the determination unit determines an angle between an optical axis of the first imaging unit and an optical axis of the second imaging unit in the predetermined direction.

10. The imaging device according to claim 9, wherein, when the instructions stored in the memory are executed by the hardware processor, the imaging device functions as a control unit configured to perform control so that the wide-angle image is generated in the combination processing unit when the angle between the optical axis of the first imaging unit and the optical axis of the second imaging unit is less than a predetermined angle.

11. A control apparatus for controlling an imaging device comprising:
- a first imaging unit and a second imaging unit, each of which is movable in a predetermined direction;
- a hardware processor; and
- a memory for storing instructions to be executed by the hardware processor, wherein, when the instructions stored in the memory are executed by the hardware processor, the control apparatus functions as:
  - a combination processing unit configured to combine a first image obtained by the first imaging unit and a second image obtained by the second imaging unit to generate a wide-angle image;
  - a determination unit configured to determine whether or not to generate the wide-angle image by the combination processing unit, based on an overlapping range between an imaging range of the first imaging unit and an imaging range of the second imaging unit;
  - an output unit configured to switch between a) the wide-angle image and b) at least one of the first image and the second image image based on the overlapping range changed by a movement of at least one of the first imaging unit and the second imaging unit in the predetermined direction and output a) the wide-angle image or b) at least one of the first image and the second image;
  - a communication unit configured to communicate with the imaging device; and
  - a display unit configured to selectively display at least one of the first image, the second image, and the wide-angle image received from the imaging device via the communication unit.

12. The control apparatus according to claim 11, wherein the display unit displays a dialog box configured to request a user's instruction when switching is performed between a) the wide-angle image and b) at least one of the first image and the second image.

13. An imaging method, comprising:
- performing imaging using a first imaging unit and a second imaging unit, each of which is movable in a predetermined direction;
- generating a wide-angle image by combining a first image obtained by the first imaging unit and a second image obtained by the second imaging unit;
- determining whether or not to generate the wide-angle image based on an overlapping range between an imaging range of the first imaging unit and an imaging range of the second imaging unit; and
- switching between a) the wide-angle image and b) at last one of the first image and the second image based on the overlapping range changed by a movement of at least one of the first imaging unit and the second imaging unit in the predetermined direction and outputting a) the wide-angle image or b) at least one of the first image and the second image.

14. A non-transitory computer-readable storage medium storing a computer program configured to execute an imaging method comprising:
- performing imaging using a first imaging unit and a second imaging unit, each of which is movable in a predetermined direction;
- generating a wide-angle image by combining a first image obtained by the first imaging unit and a second image obtained by the second imaging unit;
- determining whether or not to generate the wide-angle image based on an overlapping range between an imaging range of the first imaging unit and an imaging range of the second imaging unit; and
- switching between a) the wide-angle image and b) at least one of the first image and the second image based on the overlapping range changed by a movement of at least one of the first imaging unit and the second imaging unit in the predetermined direction and outputting a) the wide-angle image or b) at least one of the first image and the second image.

* * * * *